US012738066B2

(12) United States Patent
Singh

(10) Patent No.: US 12,738,066 B2
(45) Date of Patent: Sep. 15, 2026

(54) METHOD AND SYSTEM FOR IDENTIFYING EMERGING THREATS IN REAL-TIME

(71) Applicant: SKYLARK LABS INC., Bethel, CT (US)

(72) Inventor: Amarjot Singh, Bethel, CT (US)

(73) Assignee: SKYLARK LABS INC.

( * ) Notice: Subject to any disclaimer, the term of this patent is extended or adjusted under 35 U.S.C. 154(b) by 319 days.

(21) Appl. No.: 18/622,951

(22) Filed: Mar. 31, 2024

(65) Prior Publication Data

US 2025/0308240 A1 Oct. 2, 2025

(51) Int. Cl.
*G06K 9/62* (2022.01)
*G06F 18/213* (2023.01)
(Continued)

(52) U.S. Cl.
CPC ............ *G06V 20/52* (2022.01); *G06F 18/213* (2023.01); *G06F 18/24137* (2023.01);
(Continued)

(58) Field of Classification Search
CPC ........ G06V 10/00; G06V 10/40; G06V 10/42; G06V 10/44; G06V 10/454; G06V 10/46; G06V 10/462; G06V 10/464; G06V 10/467; G06V 10/469; G06V 10/48; G06V 10/50; G06V 10/507; G06V 10/513; G06V 10/54; G06V 10/56; G06V 10/62; G06V 10/70; G06V 10/72; G06V 10/74; G06V 10/75; G06V 10/751; G06V 10/753; G06V 10/758; G06V 10/761; G06V 10/762; G06V 10/764; G06V 10/765; G06V 10/766; G06V 10/768; G06V 10/77; G06V 10/771; G06V 10/7715; G06V 10/772; G06V 10/778; G06V 10/80; G06V 10/806; G06V 10/809;
(Continued)

(56) References Cited

U.S. PATENT DOCUMENTS 9,805,264 B2 * 10/2017 Kuznetsova ....... G06V 10/7715
10,402,655 B2 * 9/2019 Javan Roshtkhari .. G06V 20/48
(Continued)

OTHER PUBLICATIONS

Rajesh Kumar Tripathi, Anand Singh Jalal, Subhash Chand Agrawal; Suspicious human activity recognition: a review; ResearchGate; Feb. 28, 2017.

*Primary Examiner* — Eric Rush
(74) *Attorney, Agent, or Firm* — Kendal M. Sheets

(57) ABSTRACT

The disclosure relates to a method and system for identifying emerging threats in real-time using Artificial Intelligence (AI) model. The method includes receiving first set of feature vectors created from content; determining first set of dimensions for each of first set of feature vectors; comparing first set of dimensions, for each of first set of feature vectors, with second set of dimensions associated with each of second sets of feature vectors created for historical events; computing degree of proximity of first set of feature vectors relative to each of second sets of feature vectors through proximity analysis; identifying contemporaneous to receiving first set of feature vectors, second set of feature vectors from second sets of feature vectors; classifying event into event category from predefined event categories based on computed degree of proximity and predefined threshold; and identifying event as emerging threat.

25 Claims, 11 Drawing Sheets

(51) Int. Cl.

| | |
|---|---|
| ***G06F 18/2413*** | (2023.01) |
| ***G06F 18/26*** | (2023.01) |
| ***G06V 10/40*** | (2022.01) |
| ***G06V 10/46*** | (2022.01) |
| ***G06V 10/54*** | (2022.01) |
| ***G06V 10/62*** | (2022.01) |
| ***G06V 10/70*** | (2022.01) |
| ***G06V 10/72*** | (2022.01) |
| ***G06V 10/74*** | (2022.01) |
| ***G06V 10/75*** | (2022.01) |
| ***G06V 10/762*** | (2022.01) |
| ***G06V 10/764*** | (2022.01) |
| ***G06V 10/772*** | (2022.01) |
| ***G06V 20/40*** | (2022.01) |
| ***G06V 20/52*** | (2022.01) |
| ***G06V 40/20*** | (2022.01) |
| ***G08B 13/196*** | (2006.01) |

(52) U.S. Cl.

CPC .............. *G06F 18/26* (2023.01); *G06V 10/40* (2022.01); *G06V 10/464* (2022.01); *G06V 10/513* (2022.01); *G06V 10/54* (2022.01); *G06V 10/62* (2022.01); *G06V 10/70* (2022.01); *G06V 10/72* (2022.01); *G06V 10/75* (2022.01); *G06V 10/758* (2022.01); *G06V 10/761* (2022.01); *G06V 10/762* (2022.01); *G06V 10/764* (2022.01); *G06V 10/768* (2022.01); *G06V 10/772* (2022.01); *G06V 20/41* (2022.01); *G06V 20/44* (2022.01); *G06V 20/46* (2022.01); *G06V 40/20* (2022.01); *G08B 13/19613* (2013.01); *G06T 2207/30232* (2013.01)

(58) Field of Classification Search

CPC ........ G06V 10/82; G06V 20/35; G06V 20/40; G06V 20/41; G06V 20/44; G06V 20/46; G06V 20/47; G06V 20/50; G06V 20/52; G06V 20/53; G06V 20/54; G06V 20/70; G06V 40/00; G06V 40/10; G06V 40/20; G06V 40/23; G06V 40/25; G06V 40/28; G06V 2201/07; G06V 2201/08; G06N 3/02; G06N 3/04; G06N 3/045; G06N 3/0455; G06N 3/08; G06N 3/091; G06T 7/00; G06T 7/40; G06T 7/50; G06T 7/60; G06T 7/70; G06T 7/90; G06T 2207/10004; G06T 2207/10016; G06T 2207/20081; G06T 2207/20084; G06T 2207/30196; G06T 2207/30232; G06F 18/00; G06F 18/20; G06F 18/21; G06F 18/211; G06F 18/213; G06F 18/2131; G06F 18/214; G06F 18/2163; G06F 18/22; G06F 18/23; G06F 18/232; G06F 18/24; G06F 18/2411; G06F 18/2413; G06F 18/24133; G06F 18/24137; G06F 18/24147; G06F 18/25; G06F 18/253; G06F 18/26; G06F 18/28; G08B 13/196; G08B 13/19602; G08B 13/19606; G08B 13/19608; G08B 13/19613

USPC ........ 382/100, 103, 104, 115, 118, 155–159, 382/181, 190–192, 195, 206, 224–229, 382/291, 325; 348/61, 135, 143, 348/152–155; 706/12, 14–16, 20–22, 706/25–27, 45–48, 62

See application file for complete search history.

(56) References Cited

U.S. PATENT DOCUMENTS

| | | | | |
|---|---|---|---|---|
| 11,195,067 | B2 | 12/2021 | Shrestha et al. | |
| 11,308,333 | B1 | 4/2022 | Langford et al. | |
| 11,310,270 | B1 * | 4/2022 | Weber | G06N 20/00 |
| 12,315,231 | B2 * | 5/2025 | Liao | G06V 20/70 |
| 12,367,401 | B2 * | 7/2025 | Shrestha | G06V 20/52 |
| 2021/0019645 | A1 | 1/2021 | Petrey, Jr. | |

* cited by examiner

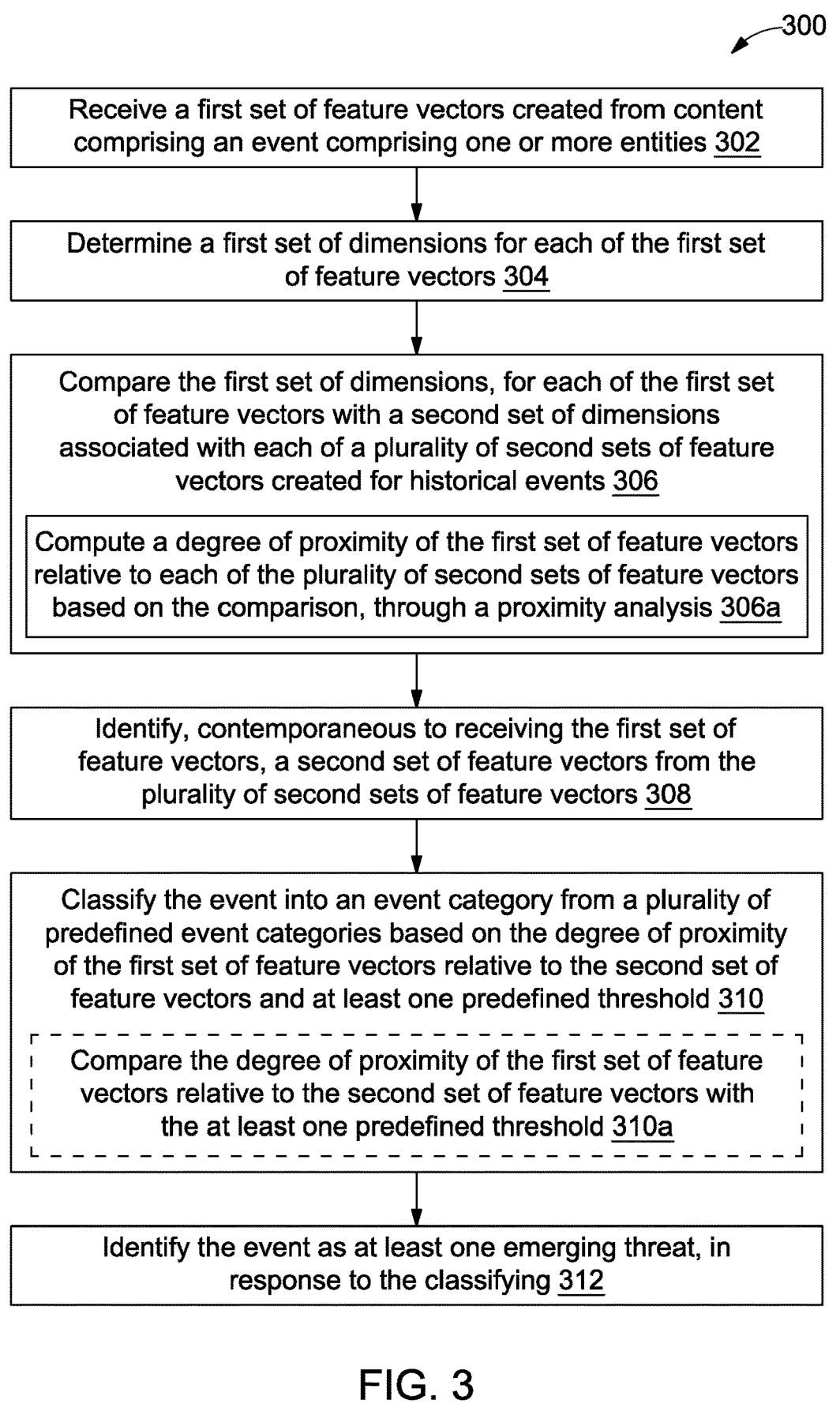

300

Receive a first set of feature vectors created from content comprising an event comprising one or more entities 302

Determine a first set of dimensions for each of the first set of feature vectors 304

Compare the first set of dimensions, for each of the first set of feature vectors with a second set of dimensions associated with each of a plurality of second sets of feature vectors created for historical events 306

Compute a degree of proximity of the first set of feature vectors relative to each of the plurality of second sets of feature vectors based on the comparison, through a proximity analysis 306a Identify, contemporaneous to receiving the first set of feature vectors, a second set of feature vectors from the plurality of second sets of feature vectors 308

Classify the event into an event category from a plurality of predefined event categories based on the degree of proximity of the first set of feature vectors relative to the second set of feature vectors and at least one predefined threshold 310

Compare the degree of proximity of the first set of feature vectors relative to the second set of feature vectors with the at least one predefined threshold 310a Identify the event as at least one emerging threat, in response to the classifying 312

FIG. 3

METHOD AND SYSTEM FOR IDENTIFYING EMERGING THREATS IN REAL-TIME

TECHNICAL FIELD

The present disclosure relates generally to Artificial Intelligence (AI), and more particularly to a system and a method for identifying emerging threats in real-time using an AI model.

BACKGROUND

Today, in various industrial applications, Artificial Intelligence (AI) systems are extensively employed for threat detection. The AI systems leverage pattern recognition and classification algorithms to identify potential risks and anomalies within data streams. These systems are adept at processing large volumes of data and recognizing known threats based on pre-defined patterns and characteristics. For example, in security surveillance, the AI systems analyze video feeds to detect suspicious activities or individuals. Similarly, in environmental monitoring, the AI systems identify deviations from expected environmental conditions, such as abnormal levels or fluctuations, indicating potential threats. Moreover, in object detection applications, the AI systems identify and classify objects of interest, facilitating tasks management and quality control.

However, these conventional AI systems face significant challenges when it comes to identifying emerging threats in real-time. The conventional AI systems depend on extensive server setups to extract insights from vast datasets. This reliance requires significant computational power and access to expansive datasets, resources that are not consistently accessible in these environments. Further, the conventional AI systems lack the ability to respond rapidly to evolving scenarios and accurately identify emerging threats which are previously unseen. This limitation stems from reliance of the conventional AI systems on static models trained on historical data, which may not adequately encompass diversity and complexity of new threats or dynamically changing environments. As a result, the conventional AI systems struggle to generalize effectively and may exhibit reduced efficacy in detecting unforeseen risks or anomalies. In other words, the conventional AI systems rely heavily on pre-existing training data and struggle to generalize to new situations, leading to inefficiencies and inaccuracies in threat detection. Additionally, the inherent biases and limitations of the training data can impact system's performance, potentially leading to false positives or negatives. Furthermore, the intricate and ever-changing dynamics of the open environments introduce a multitude of variables that the conventional AI systems may fail to comprehensively incorporate, thereby hindering their efficacy in identifying emergent threats.

Therefore, there is a need to overcome these challenges and enable more robust and accurate real-time threat detection capabilities.

SUMMARY

In one embodiment, a method for identifying emerging threats in real-time using an Artificial Intelligence (AI) model is disclosed. In one example, the method may include receiving a first set of feature vectors created from content. The content may include an event. The event may further include one or more entities. The method may further include determining a first set of dimensions for each of the first set of feature vectors. The method may further include comparing the first set of dimensions, for each of the first set of feature vectors, with a second set of dimensions associated with each of a plurality of second sets of feature vectors created for historical events. It should be noted that the second set of dimensions and the plurality of second sets of feature vectors may be stored in an associated primary repository. The first set of dimensions and second set of dimensions may include at least one of a frequency dimension, a recency dimension, a pattern dimension, and an intensity dimension. The method may further include computing a degree of proximity of the first set of feature vectors relative to each of the plurality of second sets of feature vectors based on the comparison, through a proximity analysis. The method may further include identifying, contemporaneous to receiving the first set of feature vectors, a second set of feature vectors from the plurality of second sets of feature vectors. The second set of feature vectors may have the highest degree of proximity to the first set of feature vectors. The method may further include classifying the event into an event category from a plurality of predefined event categories based on the degree of proximity of the first set of feature vectors relative to the second set of feature vectors and at least one predefined threshold. The plurality of predefined event categories may include an existing event, a new event, and a partially existing event. The method may further include identifying the event as at least one emerging threat, in response to the classifying.

In another embodiment, a system for identifying emerging threats in real-time using an Artificial Intelligence (AI) model is disclosed. In one example, the system may include a processor and a memory communicatively coupled to the processor. The memory may store processor-executable instructions, which, on execution, may cause the processor to receive a first set of feature vectors created from content. The content may include an event. The event may further include one or more entities. The processor-executable instructions, on execution, may further cause the processor to determine a first set of dimensions for each of the first set of feature vectors. The processor-executable instructions, on execution, may further cause the processor to compare the first set of dimensions, for each of the first set of feature vectors with a second set of dimensions associated with each of a plurality of second sets of feature vectors created for historical events. It should be noted that the second set of dimensions and the plurality of second sets of feature vectors may be stored in an associated primary repository. The first set of dimensions and the second set of dimensions may include at least one of a frequency dimension, a recency dimension, a pattern dimension, and an intensity dimension. The processor-executable instructions, on execution, may further cause the processor to compute a degree of proximity of the first set of feature vectors relative to each of the plurality of second sets of feature vectors based on the comparison, through a proximity analysis. The processor-executable instructions, on execution, may further cause the processor to identify, contemporaneous to receiving the first set of feature vectors, a second set of feature vectors from the plurality of second sets of feature vectors. The second set of feature vectors may have the highest degree of proximity to the first set of feature vectors. The processor-executable instructions, on execution, may further cause the processor to classify the event into an event category from a plurality of predefined event categories based on the degree of proximity of the first set of feature vectors relative to the second set of feature vectors and at least one predefined threshold. The plurality of predefined event categories may include an existing event, a new event, and a partially existing event. The processor-executable instructions, on execution, may further cause the processor to identify the event as at least one emerging threat, in response to the classifying.

In yet another embodiment, a non-transitory computer-readable medium storing computer-executable instruction for identifying emerging threats in real-time using an Artificial Intelligence (AI) model is disclosed. The stored instructions, when executed by a processor, may cause the processor to perform operations including receiving a first set of feature vectors created from content. The content may include an event. The event may further include one or more entities. The operations may further include determining a first set of dimensions for each of the first set of feature vectors. The operations may further include comparing the first set of dimensions, for each of the first set of feature vectors, with a second set of dimensions associated with each of a plurality of second sets of feature vectors created for historical events. It should be noted that the second set of dimensions and the plurality of second sets of feature vectors may be stored in an associated primary repository. The first set of dimensions and second set of dimensions may include at least one of a frequency dimension, a recency dimension, a pattern dimension, and an intensity dimension. The operations may further include computing a degree of proximity of the first set of feature vectors relative to each of the plurality of second sets of feature vectors based on the comparison, through a proximity analysis. The operations may further include identifying, contemporaneous to receiving the first set of feature vectors, a second set of feature vectors from the plurality of second sets of feature vectors. The second set of feature vectors may have the highest degree of proximity to the first set of feature vectors. The operations may further include classifying the event into an event category from a plurality of predefined event categories based on the degree of proximity of the first set of feature vectors relative to the second set of feature vectors and at least one predefined threshold. The plurality of predefined event categories may include an existing event, a new event, and a partially existing event. The operations may further include identifying the event as at least one emerging threat, in response to the classifying.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3 is a flow diagram of an exemplary process for identifying emerging threats in real-time, in accordance with some embodiments of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
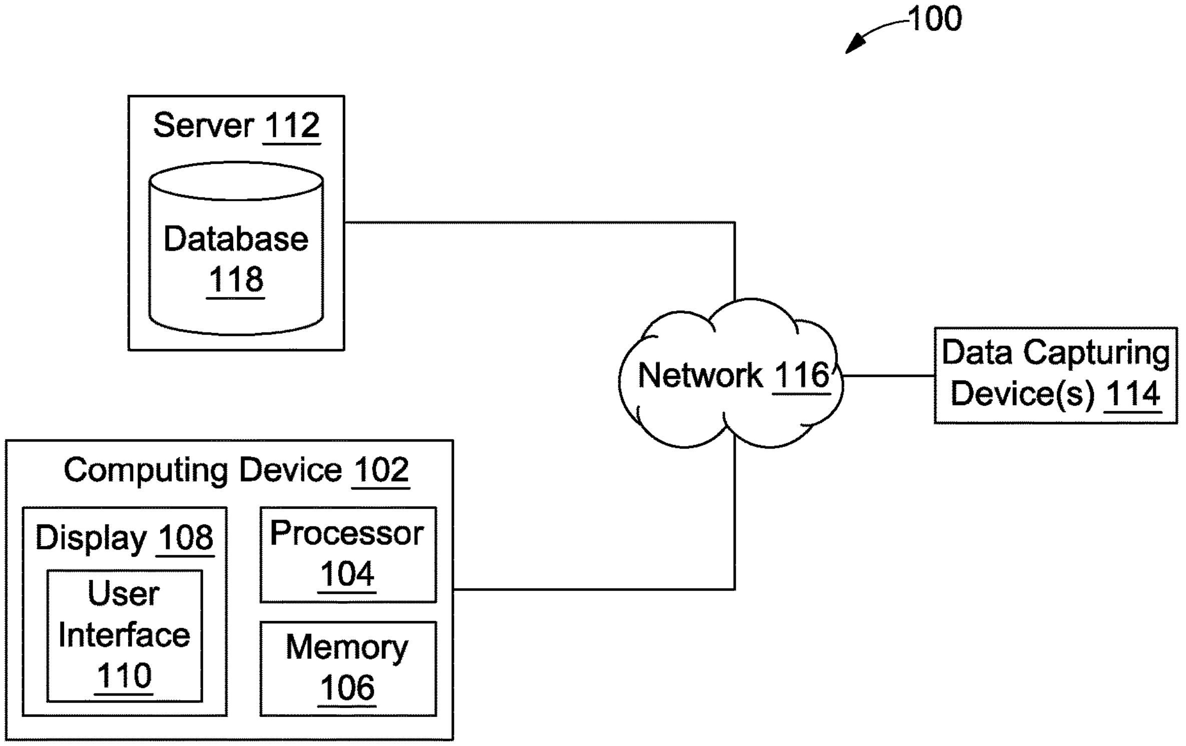
FIG. 1 illustrates an exemplary environment in which various embodiments may be employed.

An exemplary environment 100 in which various embodiments may be employed, is illustrated in FIG. 1. The environment 100 may include a computing device 102. The computing device 102 may identify emerging threats in real-time using an Artificial Intelligence (AI) model (not shown in FIG. 1). For example, for identifying emerging threats, the computing device 102 may perform various functions including receiving a first set of feature vectors, determining a first set of dimensions for the first set of feature vectors, comparing the first set of dimensions with a second set of dimensions associated with each of a plurality of second sets of feature vectors created for historical events, computing a degree of proximity of the first set of feature vectors relative to each of the second sets of feature vectors, identifying a second set of feature vectors with the highest degree of proximity to the first set of feature vectors, classifying an event into an event category, identifying the event as an emerging threat, and the like. This is further explained in detail in conjunction with FIGS. 2-11. Examples of the computing device 102 may include, but are not limited to, a server, a desktop, a laptop, a notebook, a tablet, a smartphone, a mobile phone, an application server, or the like. The computing device 102 may further include a processor 104 and a memory 106.

The processor 104 may include suitable logic, circuitry, interfaces, and/or code that may be configured for identifying emerging threats. The processor 104 may be implemented based on a number of processor technologies, which may be known to one ordinarily skilled in the art. Examples of implementations of the processor 104 may include a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, Artificial Intelligence (AI) accelerator chips, a co-processor, a central processing unit (CPU), and/or a combination thereof.

In some embodiments, the AI model may be within the memory 106. The memory 106 may further store various data (for example, feature vectors, image vectors, multimedia content, the first set of dimensions, the second set of dimensions, the plurality of second sets of feature vectors, the historical events, labels, event categories, clusters of feature vectors, histogram representations, weights (assigned to feature vectors), a primary repository, a secondary repository, and the like) that may be captured, processed, and/or required by the computing device 102. The memory 106 may be a non-volatile memory or a volatile memory. Examples of non-volatile memory may include, but are not limited to, a flash memory, a Read-Only Memory (ROM), a Programmable ROM (PROM), Erasable PROM (EPROM), and Electrically EPROM (EEPROM) memory. Examples of volatile memory may include, but are not limited to, Dynamic Random-Access Memory (DRAM), and Static Random-Access memory (SRAM). The memory 106 may also store various data that may be captured, processed, and/or required by the system 100.

The memory 106 may store instructions that, when executed by the processor 104, may cause the processor 104 to identify emerging threats, in accordance with some embodiments. As will be described in greater detail in conjunction with FIG. 2 to FIG. 11, in order to identify emerging threats, the processor 104 in conjunction with the memory 106 may perform various functions including receiving the first set of feature vectors, determining the first set of dimensions for the first set of feature vectors, comparing the first set of dimensions with the second set of dimensions associated with each of the plurality of second sets of feature vectors created for the historical events, computing the degree of proximity of the first set of feature vectors relative to each of the second sets of feature vectors, identifying the second set of feature vectors with the highest degree of proximity to the first set of feature vectors, classifying the event into the event category, identifying the event as the emerging threat, and the like.

The computing device 102 may also include a display 108. The display 108 may further include a user interface 110. A user, or an administrator may interact with the computing 102 and vice versa through the display 108. By way of an example, the display 108 may be used to display results of analysis (i.e., the content, the multimedia content, the dimensions, an event category, emerging threat, information about a threat like a source, a target, and severity, histogram representations, a notification about the emerging threat, user interaction options for manual labeling, etc.) performed by the computing device 102, to the user or the administrator. By way of another example, the user interface 110 may be used by the user or the administrator to provide inputs to the computing device 102. Thus, for example, in some embodiments, the computing device 102 may receive an input from the user or the administrator to check details of the threat. Further, for example, in some embodiments, the computing device 102 may render results to the user/administrator via the user interface 110.

In some embodiments, the computing device 102 may include a computer system such as a desktop computer, notebook or laptop computer, netbook, a tablet computer, an e-book reader, a GPS device, a camera, a personal digital assistant (PDA), a handheld electronic device, a cellular telephone, a smartphone, an augmented/virtual reality device, another suitable electronic device, or any suitable combination thereof and may also include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR.

In some embodiments, the computing device 102 may further communicate with a server 112 or data capturing device(s) 114 via a network 116 for sending and receiving various data (for example, for receiving content corresponding to an event). The network 116 may correspond to a communication network that may include a communication medium through which the computing device 102 may communicate with other devices or databases. Examples of the communication network may include, but are not limited to, Internet, a cloud network, a Wireless Fidelity (Wi-Fi) network, a Personal Area Network (PAN), a Local Area Network (LAN), or a Metropolitan Area Network (MAN).

Various devices in the environment 100 may be configured to connect to the network 116, in accordance with various wired and wireless communication protocols. Examples of such wired and wireless communication protocols may include, but are not limited to, a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

By way of an example, in some embodiments, the computing device 102 may receive information from the server 112 or the data capturing device(s) 114. The server 112 may further include a database 118. In some embodiments, the AI model may be within the server 112 instead of being stored in the memory 106. The database 118 may store information such as the content, the second set of dimensions, the plurality of second sets of feature vectors, the historical events, pre-defined event categories, the AI model, etc. The data capturing device(s) 114 may capture the content that may be processed to the server 112 or the computing device 102 as required. Further, the data capturing device(s) 114 may be, but are not limited to, a camera, a sensor, X-ray crystallography equipment, fluorescence spectroscopy instruments, or the like. Examples of the camera may include, but are not limited to, a digital camera, an analog camera, a smartphone camera, an action camera, a webcam, a security camera, a film camera, an aerial camera (for example, a drone camera), a medical camera, a hybrid camera, and the like. It should be noted that in some embodiments, the computing device 102 may be integrated in the data capturing device(s) 114.

The computing device 102 may identify emerging threats in real-time using the AI model upon receiving the content captured via the data capturing device(s) 114. The computing device 102 may analyze dimensions and compare them with historical event data. The computing device 102 may compute proximity, identify the most proximate event, classify the event into a predefined category, and further flag the event as an emerging threat if applicable. Additionally, the computing device 102 may perform cluster analysis, weight assignment, threshold-based classification, and real-time notification generation.

Figure 2:
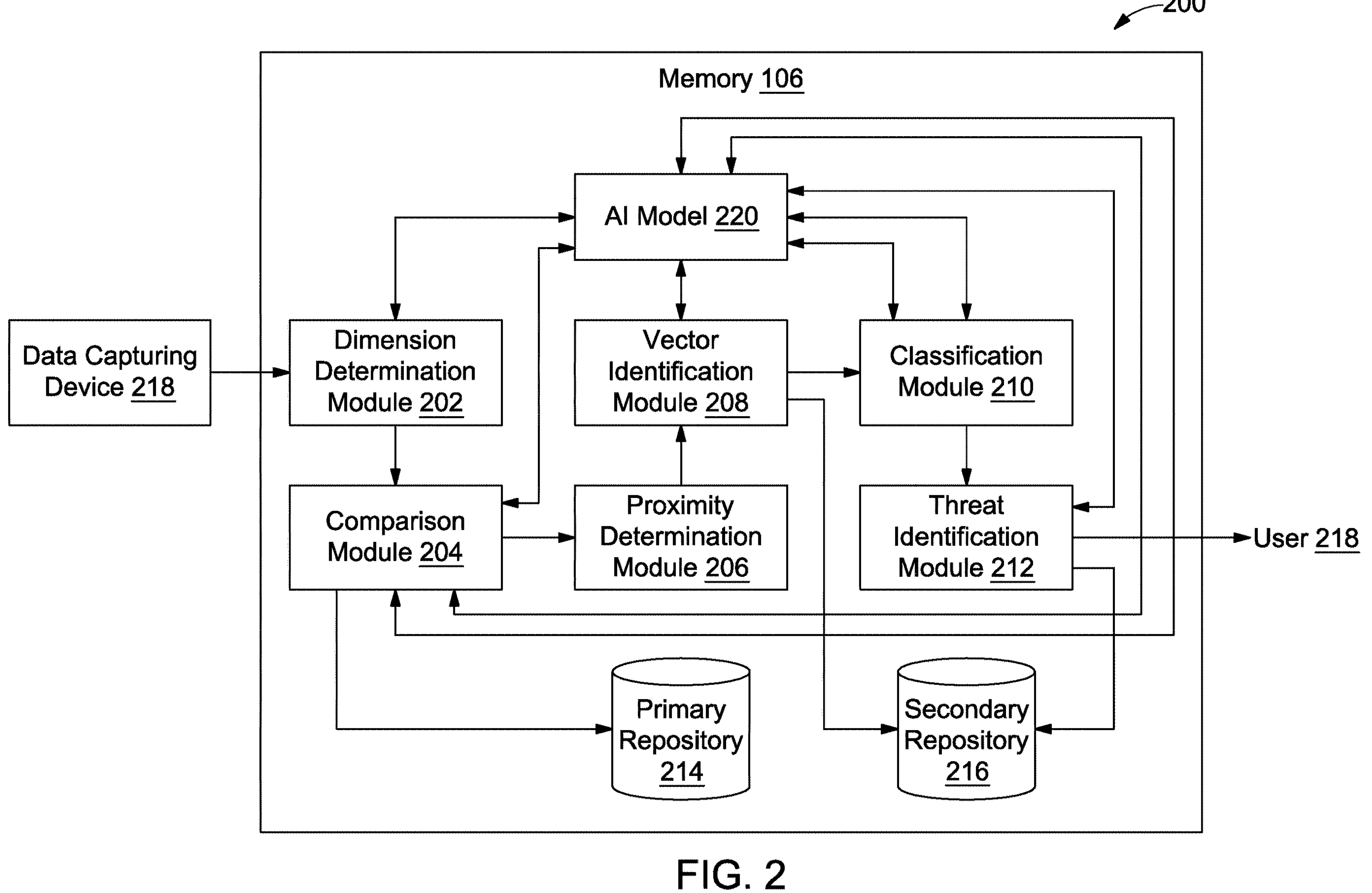
FIG. 2 is a functional block diagram of various modules within a memory of a computing device configured for identifying emerging threats in real-time, in accordance with some embodiments of the present disclosure.

Referring now to FIG. 2, a functional block diagram 200 of various modules within the memory 106 of the computing device 102 configured for identifying emerging threats in real-time is illustrated, in accordance with some embodiments of the present disclosure. FIG. 2 is explained in conjunction with FIG. 1. As illustrated in FIG. 2, the memory 106 may include a dimension determination module 202, a comparison module 204, a proximity determination module 206, a vector identification module 208, a classification module 210, and a threat identification module 212. Also, the memory 106 may include a primary repository 214 and a secondary repository 216.

The primary repository 214 may correspond to permanent repository which stores data permanently. The secondary repository 216 may correspond to a temporary repository which stores data for a predefine period. When an event is initially observed, the event may be stored in the secondary repository 216. However, upon repeated occurrences of the same event, the event may be then stored in the primary repository 214 for permanent storage. Conversely, if the event does not recur, the event may be deleted from the secondary repository 216 after the predefined period. Further, the memory 106 may include a database (not shown in FIG. 2) for storing various data or intermediate results generated through the modules 202-212.

The dimension determination module 202 may be configured to receive a first set of feature vectors. The first set of feature vectors may be created from content captured via a data capturing device 218 (for example, one of the data capturing device(s) 114). In some embodiments, the data capturing device 218 may be a camera, the set of feature vectors may be a set of image vectors, and the content may be multimedia content. The data capturing device 218 may be, but is not limited to, the camera, a sensor, X-ray crystallography equipment, fluorescence spectroscopy instruments, or the like. Examples of the camera may include, but are not limited to, a digital camera, an analog camera, a smartphone camera, an action camera, a webcam, a security camera, a film camera, an aerial camera (for example a drone camera), a medical camera, a hybrid camera, and the like. The content may include an event which may further include one or more entities. The content may include, but is not limited to, images, videos, a radar signature, a lidar signature, a protein structure, data corresponding to cyber-attacks, sensor data, or any other data captured by the data capturing device 218. For example, in a surveillance system, the content may be a footage from security cameras monitoring a facility.

Further, for example, in case of aerial reconnaissance, the content may be an aerial video footage captured by a surveillance drone and an event within the content may be a suspicious aerial formation near a military base. By way of an example, in case of marine reconnaissance, the content may be a surveillance camera footage from a coastal monitoring station, and the event may be an unknown vessel entering restricted maritime waters. By way of an example, in drone reconnaissance, the content may be a live video feed from a drone flying over an urban area and the event may be a suspicious vehicle moving erratically through city streets. By way of an example, in accident hotspot detection systems, the content may be a traffic camera footage from a busy intersection, and the event may be traffic violations at the intersection, indicating a potential accident hotspot.

In some embodiments, the term “event” may refer to a single activity. For example, the event may be “detection of a person” and another event may be “an attempt to cut through a fence”. Alternatively, in some other embodiments, the term “event” may refer to a sequence of related activities occurring within a specific time period. For example, the event may be “a person attempting to cut through a fence followed by arrival of a vehicle to facilitate a smuggling operation”. The entities may include, but are not limited to, a person (i.e., individuals involved in the event), a vehicle (for example, cars, a drone, trucks, motorcycles, aerial vehicle, and the like), concealed weapons, vessels, a building (i.e., structures involved or affected), an animal (i.e., pets, military animals, wildlife, and the like), an equipment (i.e., tools, machinery, and the like), a crowd (i.e., groups of people gathered), a stage (i.e., a platform for performances or presentations), a landmark (i.e., a recognizable features in the event), an emergency responders (i.e., police, firefighters, paramedics, and the like), a merchandise (i.e., products being promoted or sold).

The first set of feature vectors may represent key attributes of the content. For example, in the case of images, the first set of feature vectors may represent pixel values, color histograms, texture features, or other image descriptors. It should be noted that a weight may be assigned to each of the first set of feature vectors based on a predefined weight allocation criteria. This weighted analysis helps prioritize features that are most likely to indicate a threat, such as unusual patterns or intensities of activities. For example, consider a border surveillance system where an objective is to detect and prevent unauthorized border crossings. In this scenario, one of the predefined weight allocation criteria may be based on the spatial proximity of feature vectors to a border fence. The feature vectors captured closer to the border fence may be more relevant and important for threat detection as compared to those captured farther away. By way of an example, a weight assigned to feature vectors captured within 100 meters of the border fence may be “0.9”, feature vectors captured between 100 to 200 meters from the border fence may be “0.7”, and feature vectors captured beyond 200 meters from the border fence may be “0.5”. The predefined weight allocation criteria may be, but are not limited to a spatial proximity, temporal factors, motion detection, location importance, and object detection.

By way of an example, consider a scenario where the content includes images captured by a traffic monitoring camera. In such a case, each image of the images may be analyzed to extract features such as vehicle shapes, vehicle color, and vehicle positions. Further, these features may be converted into the first set of feature vectors and weights may be assigned to the feature vectors. For example, a feature vector representing a red car traveling at a certain speed in a specific lane may capture attributes such as color intensity, vehicle size, and direction of motion. To create the first set of feature vectors, various feature extraction techniques may be used to capture relevant information from the content. The techniques may include, but are not limited to, image processing algorithms, computer vision methods, machine learning models, or a combination thereof. For example, in the case of video surveillance, an object detection algorithm may be used to identify and track moving objects in video frames, generating feature vectors representing spatial and temporal characteristics of objects.

Further, the dimension determination module 202 may be configured to determine a first set of dimensions for each of the first set of feature vectors using an Artificial Intelligence (AI) model 220. The AI model 220 may correspond to a trained AI model. The AI model 220 may be a single AI model or an ensembled AI model. The AI model 220 may use a semi-supervised clustering analysis approach. The dimension determination module 202 may be communicatively coupled to the comparison module 204. The comparison module 204 may be configured to compare the first set of dimensions with a second set of dimensions associated with each of a plurality of second sets of feature vectors. The plurality of second sets of feature vectors may be created for historical events. It should be noted that the second set of dimensions and the plurality of second sets of feature vectors may be stored in the primary repository 214. The comparison module 204 may be communicatively coupled to the proximity determination module 206.

The first set of dimensions and the second set of dimensions may include at least one of a frequency dimension, a recency dimension, a pattern dimension, and an intensity dimension. The frequency dimension may correspond to the frequency of occurrence of the event, a behavior, an activity, or a feature within the first set of feature vectors captured within the content. This is a measure of how often a specific event, behavior, activity, or feature appears in the first set of feature vectors. For example, in one embodiment, surveillance cameras may record instances of vehicles or individuals moving in proximity to a border fence during nighttime hours, indicating potential illegal activity. Each instance contributes to the frequency dimension, helping border security officials to identify hotspots or patterns of the illegal activity. The recency dimension may correspond to time-based proximity with a timestamp associated with the content. For example, the recency dimension may indicate time passed since the illegal activity occurred. It should be noted that recent incidents may have higher recency dimension values.

The pattern dimension may correspond to a modification in one or more attributes of the one or more entities. The pattern dimension may be determined based on motion signatures of the one or more entities during occurrence of the event. Examples of the one or more attributes may include, but are not limited to, an object size and shape, a spatial distribution, texture characteristics, temporal changes, structural elements, and a pose and orientation. In one embodiment, dimensions (i.e., the size and shape) of an entity across different events may be determined. For example, in a surveillance system, it may be determined if a certain entity appears larger or has a different shape in one event as compared to another event. In one embodiment, how patterns are distributed spatially in different events may be analyzed. This may include examining an arrangement or layout of entities within a scene and comparing these spatial patterns across events. In one embodiment, texture dimensions of patterns may be assessed, such as variations in texture density or orientation. For example, the texture patterns of surfaces or materials (i.e., the entities) may be compared in different events. In one embodiment, it may be investigated how patterns evolve over time in different events. This may include tracking changes in shapes or movements of the entities across frames and analyzing temporal dimension of these patterns. In one embodiment, structural elements within events may be identified and compared. This may include recognizing key features, landmarks, or specific structures present in different scenes. In one embodiment, the pose or orientation of the entities in different events may be examined. It should be noted that changes in a way the entities are positioned or oriented may be detected. Further, the intensity dimension may correspond to a magnitude of an impact of event. For example, in the surveillance system, where a breach may be detected where individuals are attempting to cross the border fence. In such a case, the intensity dimension may measure a severity of the breach based on factors such as the number of individuals involved, their actions, and any potential threats posed.

The proximity determination module 206 may be configured to compute a degree of proximity of the first set of feature vectors relative to each of the plurality of second sets of feature vectors based on the comparison through a proximity analysis, using the AI model. For example, the degree of proximity may be computed on a scale of 10, 100, 1000, or the like. In some embodiments, the degree of proximity may be in percentage. In some embodiments, the degree of proximity may be in other forms. To compute the degree of proximity, the proximity determination module 206 may generate one or more clusters of feature vectors. The one or more clusters of feature vectors may be generated based on a similarity analysis performed on the plurality of second sets of feature vectors. It should be noted that each of the one or more clusters may include a visual word associated with a corresponding centroid. The term “visual word” represents a characteristic descriptor extracted from feature vectors. Further, a second histogram representation may be generated for each of the one or more clusters based on the corresponding visual word. Moreover, in some embodiments, a first histogram representation may be generated for the first set of feature vectors. In particular, the first histogram representation may be compared with each of the second histogram representation generated for the one or more clusters through the proximity analysis. It should be noted that the weight assigned to each of the first set of feature vectors may be considered for computing the proximity. The proximity determination module 206 may be operatively coupled to the vector identification module 208.

The vector identification module 208 may identify a second set of feature vectors from the plurality of second sets of feature vectors, contemporaneous to receiving the first set of feature vectors, using the AI model 220. The second set of feature vectors has the highest degree of proximity to the first set of feature vectors. The vector identification module 208 may be communicatively coupled to the classification module 210.

Consider a scenario where a security system is monitoring a parking lot overnight. Upon detecting a vehicle moving erratically through the parking lot, feature vectors (i.e., the first set of feature vectors) of the vehicle’s movements may be captured. These feature vectors representing various features such as the vehicle’s shape, color, and trajectory, serve as basis for subsequent analysis. To assess the degree of proximity between the captured feature vectors (i.e., the first set of feature vectors) and reference feature vectors (the second set of feature vectors) corresponding to historical events, the proximity determination module 206 employs clustering. The proximity determination module 206 may conduct a similarity analysis of the plurality of refence sets (i.e., the second sets of feature vectors), identifying groups of vectors that exhibit similar characteristics. Each of these groups constitutes a cluster, with each cluster including a collection of feature vectors that share common visual attributes. For example, in this scenario, the clustering process may identify clusters representing different types of vehicle movements within the parking lot. One cluster may include feature vectors depicting normal parking activities, while another may include feature vectors representing suspicious behaviors such as abrupt stops or erratic maneuvers. The proximity determination module 206 may associate a visual word with a corresponding centroid within each cluster. This visual word may encapsulate central features shared by the feature vectors within a cluster, providing a succinct representation of the cluster’s characteristics.

For example, the proximity determination module 206 has identified three distinct clusters such as a first cluster representing normal parking activities, a second cluster representing suspicious vehicle movements, and a third cluster indicating pedestrian traffic. Each of these three clusters may include feature vectors that share common visual characteristics, and the proximity determination module 206 may assign a visual word and centroid to each of the three clusters. Now, for each cluster, a second histogram representation may be generated based on its corresponding visual word. These second histogram representations summarize distribution of features within the three clusters, providing insight into the prevalent characteristics of the captured data within that specific grouping. Further, a first histogram representation may be generated for the captured feature vectors (i.e., the first set of feature vectors). The first histogram representation may encapsulate the distribution of features within the entirety of the captured data, offering a comprehensive overview of the observed activity in the parking lot. The proximity determination module 206 may compare the first histogram representation with each second histogram representation generated for the three clusters through the proximity analysis.

Further, the proximity determination module 206 may find that the first histogram representation of the captured feature vectors closely aligns or has the highest degree of proximity with the second histogram of the first cluster representing normal parking activities, indicating that the observed behavior is consistent with typical parking behaviors. By comparing the histograms, the degree of proximity between the observed activity and various reference sets may be effectively computed.

In some embodiments, a Visual Token Adaptation Framework (VTAF) that includes a Scatternet Hybrid Deep Learning (SHDL) network and a cosine similarity based network may be used. In the VTAF, the SHDL network may serve as an encoder, meticulously capturing and encoding intricate visual details from input images into high-dimensional visual tokens. This process prioritizes dynamic selection to highlight the most significant visual features within each image, creating a dense and informative representation. These visual tokens may then be subjected to evaluation and refinement through the cosine similarity based matching network. In other words, the SHDL network may generate visual tokens, and the cosine similarity based matching network may evaluate and refine these visual tokens.

The VTAF ensures continuous evolution of the visual tokens, leveraging matching techniques to maintain up-to-date and highly relevant visual representations. The visual tokens generated from recent image inputs may be stored in a visual token queue, which dynamically manages a collection of visual tokens. A management strategy of the visual token queue may employ mechanisms to optimize diversity and coverage of visual tokens, encompassing a wide array of visual characteristics encountered throughout the learning process. The cosine similarity based matching network may directly compare new visual tokens against those stored in the visual token queue, facilitating precise evaluations of similarity based on an orientation and a distance in high-dimensional space. It should be noted that the visual tokens generated through the SHDL network may be assessed against the visual token queue using the cosine similarity based matching network. This process may construct a dynamic "bag-of-tokens" representation for each image, enhancing adaptability and expressiveness. Further, a learning process of the VTAF may be dynamic, allowing for the evolution of visual tokens in response to their performance in representation accuracy. Tokens that consistently mismatch or underperform may be refined or replaced, ensuring adaptability to new and complex visual patterns. The VTAF may provide regular updating of the visual token queue. This ensures that the visual token queue remains a comprehensive repository of visual tokens, reflecting both a current visual phenomena and historically significant features. This dynamic management may contribute to the robustness and effectiveness of the VTAF.

The classification module 210 may be configured to classify the event into an event category from a plurality of predefined event categories, using the AI model. The classification may be performed based on the degree of proximity of the first set of feature vectors relative to the second set of feature vectors and at least one predefined threshold. In some embodiments, the degree of proximity of the first set of feature vectors relative to the second set of image may be compared with the at least one predefined threshold. The at least one predefined threshold may include a first predefined threshold and a second predefined threshold. The plurality of predefined event categories may include an existing event, a new event, and a partially existing event.

The event may be classified as the existing event, when the degree of proximity of the first set of feature vectors relative to the second set of feature vectors is above or equal to the first predefined threshold. Further, the event may be classified as the partially existing event when the degree of proximity of the first set of feature vectors relative to the second set of feature vectors is below the first predefined threshold and above or equal to the second predefined threshold. The event may be classified as the new event when the degree of proximity of the first set of feature vectors relative to the second set of feature vectors is below the second predefined threshold. The classification module 210 may be communicatively coupled to the threat identification module 212.

The threat identification module 212 may identify the event as at least one emerging threat, in response to the classification, using the AI model 220. For example, in some embodiments, the event may be classified as a new event. Further, each of the first set of dimensions may be compared with a corresponding predefined threat threshold, for the event. Furthermore, when each of the first set of dimensions is above the corresponding predefined threat threshold, the event may be identified as the at least one emerging threat. Once the event is classified as the new event, the first set of dimensions and the first set of feature vectors associated with the new event may be stored in a secondary repository. In response to identification of the at least one emerging threat, a user may be notified about the at least one emerging threat. Further, the primary repository may be updated with the first set of feature vectors and the first set of dimensions associated with the new event. For example, upon repeated identification of a particular threat, corresponding feature vectors and dimensions may be stored in the primary repository. Further, the AI model 220 may be trained using the updated primary repository. It should be noted that for training the AI model 220, a set of parameters of the AI model 220 may be modified based on the updated primary repository in real-time or near real-time.

It should be noted that the new event may cover various categories, encompassing emerging threats. The categories may include, but are not limited to, debris, reconnaissance activities, surveillance operations, intrusion detection, intrusion elimination efforts, detection of unknown objects, and identification of suspicious objects. For example, the new event may include identification of military air objects, such as military aircraft like jets and helicopters, to ensure the monitoring of airspace activity and the maintenance of national security. Additionally, the new event may include detection and identification of suspicious drones operating in restricted or sensitive areas, posing potential security risks or privacy violations. Furthermore, the new event may be identification of large drones capable of carrying heavier payloads, potentially for commercial, surveillance, or military purposes.

In some embodiments, identified potential threats may be presented on a display (such as the display 108) of user interface (such as a dashboard), enabling security analysts or administrators to manually review and assess suspicious activities. The user interface may be configured to highlight anomalies, flag unusual behaviors, and prioritize threats based on a predefined criteria such as a frequency, a recency, and a severity. For example, the dashboard may visually distinguish between different types of threats such as network intrusions, malware detections, and suspicious user activities using color coding, icons, or any other differentiating technique. Further, the analysts or administrators may click on each item associated with a threat to get detailed information about the threat including, but not limited to, a source, a target, a behavior pattern, and any related incidents. This aspect may facilitate immediate awareness and understanding of potential threats, empowering users/the analysts/the administrators to make informed decisions on further investigation or take direct mitigation actions.

Further, in some embodiments, new threats may be labelled manually by the analysts, leveraging the information provided on the dashboard, to categorize each threat accurately. This process may include a thorough analysis of threat's characteristics, such as the frequency, the recency, behavioral patterns, and an impact. The analysts may label a detected anomaly as "Unauthorized Access Attempt" after reviewing login attempt logs and identifying patterns that deviate from a normal user behavior. This manual intervention may allow for application of human expertise and contextual understanding, ensuring that each threat may be labeled with a level of precision and insight that automated systems may not achieve. This manual intervention may also enable incorporation of nuanced threat categories that reflect specific security policies and risk tolerance of an organization.

In some embodiments, contextual analysis may be performed for dynamic labelling. In this approach, a broader context in which a threat occurs may be considered including network environment, targeted systems, and potential impact. Analyzation of these factors may allow for assignment of more specific and informative labels. For example, "Insider Threat: Data Leak" may be assigned to suspicious activities within an organization suggesting an attempt to exfiltrate sensitive information. This approach may recognize that threat significance and nature may vary based on the context. The contextual analysis may enable security teams to prioritize responses according to each incident's specific circumstances. The contextual analysis may support a more strategic security approach, enabling the organizations to focus resources on threats with the highest potential impact.

Further, the AI model 220 may Identify and categorize threats based on intricate behavioral patterns going beyond simple attribute matching. This ability may allow for identification of sophisticated threats. In other words, instead of solely relying on specific characteristics or attributes of a threat, the AI model 220 may explore deeper into the behavioral nuances exhibited by potential threats, allowing for a more comprehensive understanding and detection. For example, an anomaly demonstrating lateral movement within a network and attempts to escalate privileges may be labeled as an "Advanced Persistent Threat (APT)", denoting considerable sophistication and potential danger. Analyzing the behavioral patterns may enhance comprehension of attackers' tactics, techniques, and procedures (TTPs), facilitating a creation of robust defense strategies.

In some embodiments, severity and impact assessment may be integrated with threat identification to enable a more nuanced understanding of threats. This aspect may help evaluate a potential damage a threat that may cause, considering factors such as a sensitivity of data at risk, a criticality of affected systems, and threat's capabilities. For example, a threat targeting critical infrastructure may be labeled as "High Severity: Infrastructure Disruption", highlighting both a nature of the threat and its potential consequences. This layered labeling approach may enable organizations to quickly identify and prioritize their response to the most dangerous threats, ensuring that resources are allocated where they are needed most.

In some embodiments, the threats may be identified and then classified based on their lifecycle stages. This offers insights into their current relevance and potential future behavior. For example, the threats may be classified as "Emerging", "Active", "Declining", or "Dormant", providing valuable context for the analysts. A category "Emerging" may be assigned to a new ransomware variant that is beginning to spread, signaling a need for immediate attention to prevent widespread infection. This temporal dynamic categorization may help the organizations understand evolving threat landscape, enabling them to adapt their defenses in real time and anticipate future security challenges.

In some embodiments, predictive categorization may be performed. For example, the predictive categorization for proactive defense may be performed. The predictive categorization may leverage analytics to forecast potential future actions of a detected threat, assigning categories that not only describe a current state but also anticipate next moves. This forward-looking approach may categorize a newly discovered botnet as "Potential DDOS Source", indicating both the current state and an intent behind its creation. The predictive categorization may enable the organizations to shift from a reactive to a proactive security stance, preparing defenses against anticipated threats before they materialize. Thus, organizations' ability to protect themselves against emerging cyber threats may be enhanced by the predictive categorization.

It should be noted that the computing device 102 may be implemented in programmable hardware devices such as programmable gate arrays, programmable array logic, programmable logic devices, or the like. Alternatively, the computing device 102 may be implemented in software for execution by various types of processors. An identified engine/module of executable code may, for instance, include one or more physical or logical blocks of computer instructions which may, for instance, be organized as an object, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for identifying emerging threats in real-time. For example, the exemplary system 100 and associated computing device 102 may identify emerging threats in real-time, by the process discussed herein. In particular, as will be appreciated by those of ordinary skill in the art, control logic and/or automated routines for performing the techniques and steps described herein may be implemented by the system 100 and the associated computing device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all the processes described herein may be included in the one or more processors on the system 100.

Referring now to FIG. 3, a flow diagram of an exemplary process 300 for identifying emerging threats in real-time is depicted via a flow chart, in accordance with some embodiments of the present disclosure. Each step of the process 300 may be performed by a computing device (such as the computing device 102). FIG. 3 is explained in conjunction with FIGS. 1-2.

At step 302, a first set of feature vectors may be received via a dimension determination module (such as the dimension determination module 202). The first set of feature vectors may be created from content. The content may be captured via a data capturing device (such as the data capturing device 218). In some embodiments, the data capturing device 218 may be a camera, the set of feature vectors may be a set of image vectors, and the content may be multimedia content. The data capturing device may be, but is not limited to, the camera, a sensor, X-ray crystallography equipment, fluorescence spectroscopy instruments, or the like. The content may include an event, and the event may further include one or more entities. The content may include, but is not limited to, images, videos, a radar signature, a lidar signature, a protein structure, data corresponding to cyber-attacks, sensor data, or any other data captured by the data capturing device. By way of an example, the content may be a footage from security cameras monitoring a facility. The first set of feature vectors represent key attributes of the content. For example, in the case of images, feature vectors may represent pixel values, color histograms, texture features, or other image descriptors. Further, the camera may be, but are not limited to, a digital camera, an analog camera, a smartphone camera, an action camera, a webcam, a security camera, a film camera, an aerial camera (for example a drone camera), a medical camera, a hybrid camera, and the like.

By way of an example, in case of aerial reconnaissance, the content may be an aerial video footage captured by a surveillance drone and an event within the content may be a suspicious aerial formation near a military base. By way of an example, in case of marine reconnaissance, the content may be a surveillance camera footage from a coastal monitoring station, and the event may be an unknown vessel entering restricted maritime waters. By way of an example, in accident hotspot detection systems, the content may be a traffic camera footage from a busy intersection, and the event may be traffic violations at the intersection, indicating a potential accident hotspot.

In some embodiments, the term "event" may refer to a single activity. For example, in such a case, the event may be "detection of a person" and another event may be "an attempt to cut through a fence". Alternatively, in some other embodiments, the term "event" may refer to a sequence of related activities occurring within a specific time period. For example, in such a case, the event may be "a person attempting to cut through a fence followed by arrival of a vehicle to facilitate a smuggling operation". The entities may include, but are not limited to, a person (i.e., individuals involved in the event), a vehicle (for example, cars, a drone, trucks, motorcycles, aerial vehicle, and the like), concealed weapons, vessels, a building (i.e., structures involved or affected), an animal (i.e., pets, military animals, wildlife, and the like), an equipment (i.e., tools, machinery, and the like), a crowd (i.e., groups of people gathered), a stage (i.e., a platform for performances or presentations), a landmark (i.e., a recognizable features in the event), an emergency responders (i.e., police, firefighters, paramedics, and the like), a merchandise (i.e., products being promoted or sold).

It should be noted that a weight may be assigned to each of the first set of feature vectors based on a predefined weight allocation criteria. This weighted analysis helps prioritize features that are most likely to indicate a threat, such as unusual patterns or intensities of activities. The predefined weight allocation criteria may be, but are not limited to a spatial proximity, temporal factors, motion detection, location importance, and object detection. For example, in a traffic monitoring system deployed along a highway, the objective is to identify and respond to traffic incidents promptly. One of the predefined weight allocation criteria may be based on temporal factors, specifically the time of day when the feature vectors are captured. In such a case, feature vectors captured during peak traffic hours may be more critical for incident detection compared to those captured during off-peak hours. By way of an example, a weight assigned to feature vectors captured during peak traffic hours (e.g., 7:00 AM to 9:00 AM and 4:00 PM to 7:00 PM) may be "0.9", feature vectors during captured during midday hours (e.g., 10:00 AM to 3:00 PM) may be "0.7", and feature vectors captured during late-night hours (e.g., 11:00 PM to 5:00 AM) may be "0.5". The predefined weight allocation criteria may be, but are not limited to a spatial proximity, temporal factors, motion detection, location importance, and object detection.

At step 304, a first set of dimensions may be determined for each of the first set of feature vectors using an Artificial Intelligence (AI) model (such as the AI model) 220. This step may be performed through the dimension determination module in response to receiving the first set of feature vectors. The AI model 220 may correspond to a trained AI model. The AI model 220 may be a single AI model or an ensembled AI model. The AI model 220 may use a semi-supervised clustering analysis approach.

Thereafter, at step 306, the first set of dimensions may be compared with a second set of dimensions associated with each of a plurality of second sets of feature vectors. The plurality of second sets of feature vectors may be created for historical events. It should be noted that the second set of dimensions and the plurality of second sets of feature vectors may be stored in a primary repository (such as the primary repository 214).

The first set of dimensions and the second set of dimensions may include at least one of a frequency dimension, a recency dimension, a pattern dimension, and an intensity dimension. The frequency dimension may correspond to the frequency of occurrence of the event, a behavior, an activity, or a feature within the first set of feature vectors captured within the content. This is a measure of how often a specific event, behavior, activity, or feature appears in the first set of feature vectors. For example, in one embodiment, surveillance cameras may record instances of vehicles or individuals moving in proximity to a border fence during nighttime hours, indicating potential illegal activity. Each instance contributes to the frequency dimension, helping border security officials to identify hotspots or patterns of the illegal activity. The recency dimension may correspond to time-based proximity with a timestamp associated with the content. For example, the recency dimension may indicate time passed since the illegal activity occurred. It should be noted that recent incidents may have higher recency dimension values.

The pattern dimension may correspond to a modification in one or more attributes of the one or more entities. The pattern dimension may be determined based on motion signatures of the one or more entities during occurrence of the event. Examples of the one or more attributes may include, but are not limited to, an object size and shape, a spatial distribution, texture characteristics, temporal changes, structural elements, and a pose and orientation. In one embodiment, dimensions (i.e., the size and shape) of an entity across different events may be determined. For example, in a surveillance system, it may be determined if a certain entity appears larger or has a different shape in one event as compared to another event. In one embodiment, how patterns are distributed spatially in different events may be analyzed. This may include examining an arrangement or layout of entities within a scene and comparing these spatial patterns across events. In one embodiment, texture dimensions of patterns may be assessed, such as variations in texture density or orientation. For example, the texture patterns of surfaces or materials (i.e., the entities) may be compared in different events. In one embodiment, it may be investigated how patterns evolve over time in different events. This may include tracking changes in shapes or movements of the entities across frames and analyzing temporal dimension of these patterns. In one embodiment, structural elements within events may be identified and compared. This may include recognizing key features, landmarks, or specific structures present in different scenes. In one embodiment, the pose or orientation of the entities in different events may be examined. It should be noted that changes in a way the entities are positioned or oriented may be detected. Further, the intensity dimension may correspond to a magnitude of an impact of event.

At step 308, a degree of proximity of the first set of feature vectors relative to each of the plurality of second sets of feature vectors may be computed based on the comparison through a proximity analysis, using the AI model. This step may be performed using a proximity determination module (analogous to the proximity determination module 206). For example, the degree of proximity may be computed on a scale of 10, 100, 1000, or the like. In some embodiments, the degree of proximity may be in percentage. It should be noted that the weight assigned to each of the first set of feature vectors may be considered for computing the proximity. This is further explained in detail in FIG. 4.

Thereafter, at step 310, a second set of feature vectors may be identified from the plurality of second sets of feature vectors, contemporaneous to receiving the first set of feature vectors, using the AI model. This step may be performed using a vector identification module (such as the vector identification module 208). The second set of feature vectors has the highest degree of proximity to the first set of feature vectors. The vector identification module 208 may be communicatively coupled to the classification module 210.

At step 312, the event may be classified into an event category from a plurality of predefined event categories, using the AI model. This step may be performed using a classification module (such as the classification module 210). The classification may be performed based on the degree of proximity of the first set of feature vectors relative to the second set of feature vectors and at least one predefined threshold. At step 312*a*, the degree of proximity of the first set of feature vectors relative to the second set of image may be compared with the at least one predefined threshold. The at least one predefined threshold may include a first predefined threshold and a second predefined threshold. The plurality of predefined event categories may include an existing event, a new event, and a partially existing event.

The event may be classified as the existing event, when the degree of proximity of the first set of feature vectors relative to the second set of feature vectors is above or equal to the first predefined threshold. Further, the event may be classified as the partially existing event when the degree of proximity of the first set of feature vectors relative to the second set of feature vectors is below the first predefined threshold and above or equal to the second predefined threshold. The event may be classified as the new event when the degree of proximity of the first set of feature vectors relative to the second set of feature vectors is below the second predefined threshold.

At step 314, the event may be identified as at least one emerging threat, in response to the classification, using the AI model. This step may be performed using a threat identification module (such as the threat identification module 212).

Figure 4:
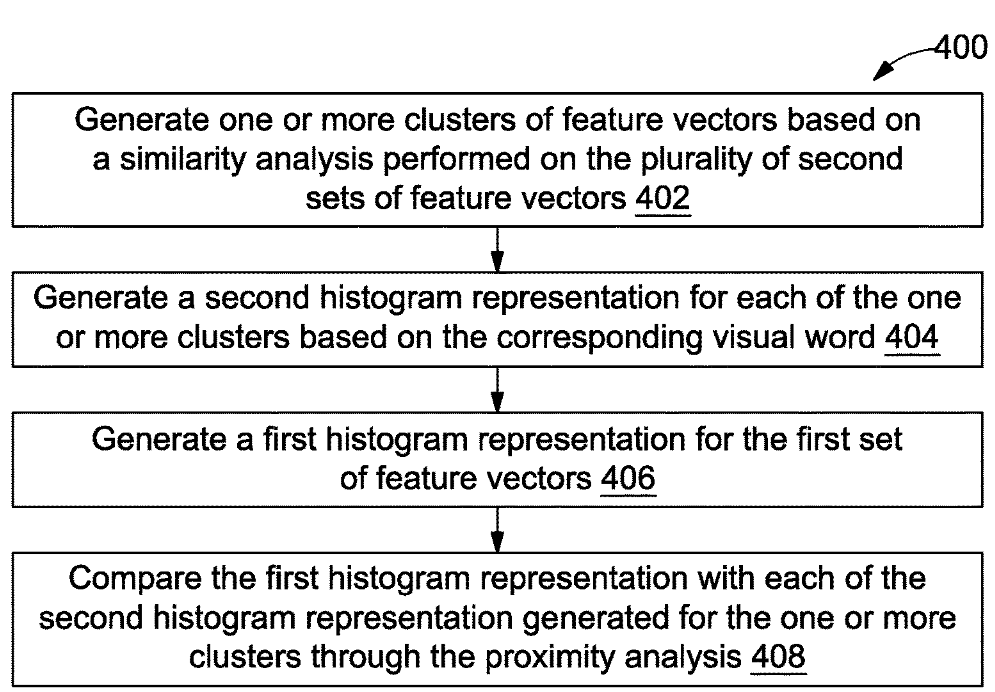
FIG. 4 is a flow diagram of a process for computing a degree of proximity between sets of feature vectors, in accordance with some embodiments of the present disclosure.

Referring now to FIG. 4, a flow diagram of an exemplary process 400 for computing a degree of proximity between sets of feature vectors is depicted via a flow chart, in accordance with some embodiments of the present disclosure. Each step of the process 400 may be performed by a proximity determination module (such as the determination module 206). FIG. 4 is explained in conjunction with FIGS. 1-3.

At step 402, one or more clusters of feature vectors may be generated. The one or more clusters of feature vectors may be generated based on a similarity analysis performed on the plurality of second sets of feature vectors. It should be noted that each of the one or more clusters may include a visual word associated with a corresponding centroid. Further, at step 404, a second histogram representation may be generated for each of the one or more clusters based on the corresponding visual word.

Thereafter, at step 406, a first histogram representation may be generated for the first set of feature vectors. At step 408, the first histogram representation may be compared with each of the second histogram representation generated for the one or more clusters through the proximity analysis.

Consider a scenario where a security system is monitoring a parking lot overnight. Upon detecting a vehicle moving erratically through the parking lot, feature vectors (i.e., the first set of feature vectors) of the vehicle's movements may be captured. These feature vectors representing various features such as the vehicle's shape, color, and trajectory, serve as basis for subsequent analysis. To assess the degree of proximity between the captured feature vectors (i.e., the first set of feature vectors) and reference feature vectors (the second set of feature vectors) corresponding to historical events, the clustering may be performed. Further, a similarity analysis of the plurality of refence sets (i.e., the second sets of feature vectors) may be conducted, identifying groups of vectors that exhibit similar characteristics. Each of these groups constitutes a cluster, with each cluster including a collection of feature vectors that share common visual attributes. For example, in this scenario, the clustering process may identify clusters representing different types of vehicle movements within the parking lot. One cluster may include feature vectors depicting normal parking activities, while another may include feature vectors representing suspicious behaviors such as abrupt stops or erratic maneuvers. A visual word may be associated with a corresponding centroid within each cluster. This visual word may encapsulate central features shared by the feature vectors within a cluster, providing a succinct representation of the cluster's characteristics.

For example, three distinct clusters such as a first cluster representing normal parking activities, a second cluster representing suspicious vehicle movements, and a third cluster indicating pedestrian traffic, may be identified. Each of these three clusters may include feature vectors that share common visual characteristics, and a visual word and centroid to each of the three clusters may be assigned. Now, for each cluster, a second histogram representation may be generated based on its corresponding visual word. These second histogram representations summarize distribution of features within the three clusters, providing insight into the prevalent characteristics of the captured data within that specific grouping. Further, a first histogram representation may be generated for the captured feature vectors (i.e., the first set of feature vectors). The first histogram representation may encapsulate the distribution of features within the entirety of the captured data, offering a comprehensive overview of the observed activity in the parking lot. Further, the first histogram representation may be compared with each second histogram representation generated for the three clusters through the proximity analysis.

Further, the first histogram representation of the captured feature vectors may closely align or has the highest degree of proximity with the second histogram of the first cluster representing normal parking activities, indicating that the observed behavior is consistent with typical parking behaviors. By comparing the histograms, the degree of proximity between the observed activity and various reference sets may be effectively computed.

In some embodiments, a Visual Token Adaptation Framework (VTAF) that includes a Scatternet Hybrid Deep Learning (SHDL) network and a cosine similarity based network may be used. In the VTAF, the SHDL network may serve as an encoder, meticulously capturing and encoding intricate visual details from input images into high-dimensional visual tokens. This process prioritizes dynamic selection to highlight the most significant visual features within each image, creating a dense and informative representation. These visual tokens may then be subjected to evaluation and refinement through the cosine similarity based matching network. In other words, the SHDL network may generate visual tokens, and the cosine similarity based matching network may evaluate and refine these visual tokens.

The VTAF ensures continuous evolution of the visual tokens, leveraging matching techniques to maintain up-to-date and highly relevant visual representations. The visual tokens generated from recent image inputs may be stored in a visual token queue, which dynamically manages a collection of visual tokens. A management strategy of the visual token queue may employ mechanisms to optimize diversity and coverage of visual tokens, encompassing a wide array of visual characteristics encountered throughout the learning process. The cosine similarity based matching network may directly compare new visual tokens against those stored in the visual token queue, facilitating precise evaluations of similarity based on an orientation and a distance in high-dimensional space. It should be noted that the visual tokens generated through the SHDL network may be assessed against the visual token queue using the cosine similarity based matching network. This process may construct a dynamic "bag-of-tokens" representation for each image, enhancing adaptability and expressiveness. Further, a learning process of the VTAF may be dynamic, allowing for the evolution of visual tokens in response to their performance in representation accuracy. Tokens that consistently mismatch or underperform may be refined or replaced, ensuring adaptability to new and complex visual patterns. The VTAF may provide regular updating of the visual token queue. This ensures that the visual token queue remains a comprehensive repository of visual tokens, reflecting both a current visual phenomena and historically significant features. This dynamic management may contribute to the robustness and effectiveness of the VTAF.

Figure 5:
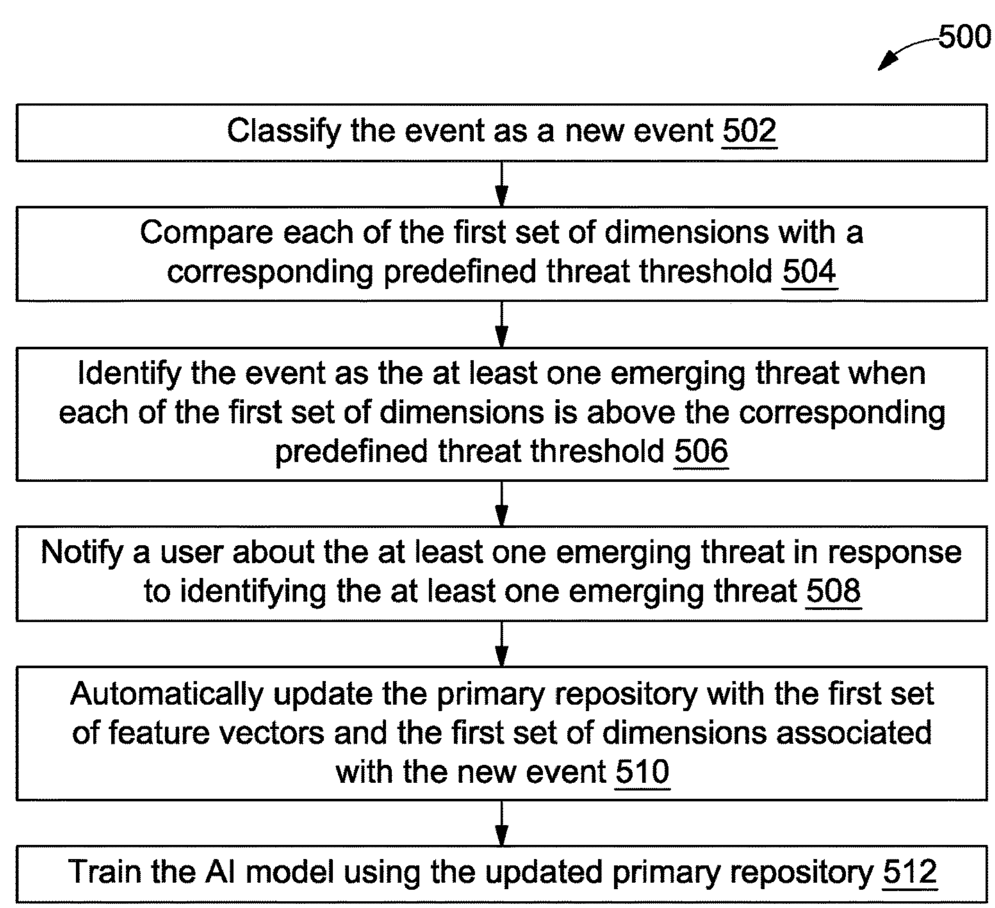
FIG. 5 is a flow diagram of a process for training an Artificial Intelligence (AI) model upon identification of an emerging threat, in accordance with some embodiments of the present disclosure.

Referring now to FIG. 5, a flow diagram of an exemplary process 500 for training an Artificial Intelligence (AI) model (such as the AI model 220) is depicted via a flow chart, in accordance with some embodiments of the present disclosure. FIG. 5 is explained in conjunction with FIGS. 1-4.

At step 502, the event may be classified as a new event. At step 504, each of the first set of dimensions may be compared with a corresponding predefined threat threshold, for the event. Further, at step 506, when each of the first set of dimensions is above the corresponding predefined threat threshold, the event may be identified as the at least one emerging threat. Once the event is classified as the new event, the first set of dimensions and the first set of feature vectors associated with the new event may be stored in a secondary repository.

In response to identification of the at least one emerging threat, at step 508, a user may be notified about the at least one emerging threat. Further, at step 510, the primary repository may be updated with the first set of feature vectors and the first set of dimensions associated with the new event, automatically. For example, upon repeated identification of a particular threat, corresponding feature vectors and dimensions may be stored in the primary repository. At step 512, the AI model may be trained using the updated primary repository. It should be noted that for training the AI model, a set of parameters of the AI model may be modified based on the updated primary repository in real-time or near real-time.

Figure 6A:
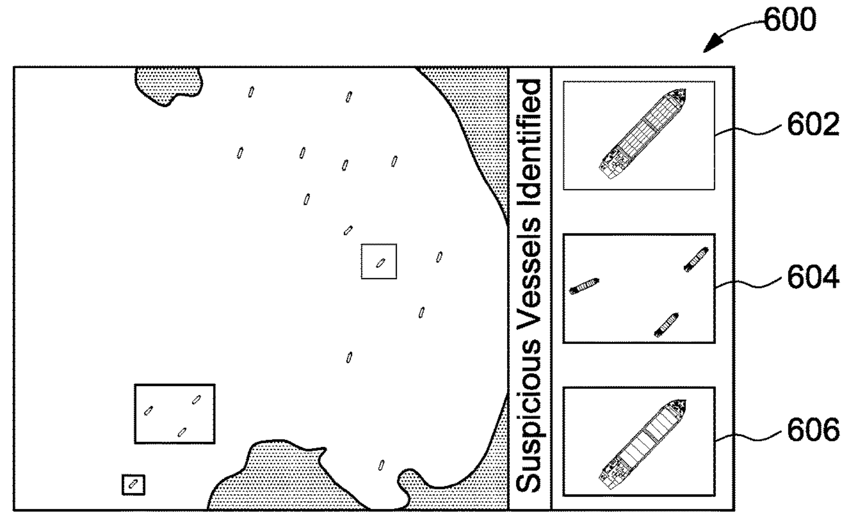
FIGS. 6A-6C illustrate an exemplary scenario of identifying suspicious vessels in a designated area, in accordance with some embodiments of the present disclosure.
Figure 6B:
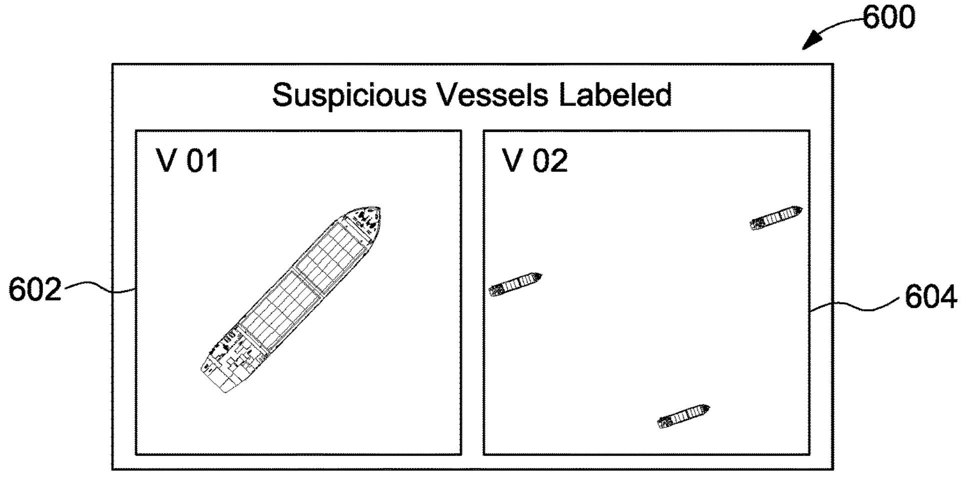
Figure 6C:
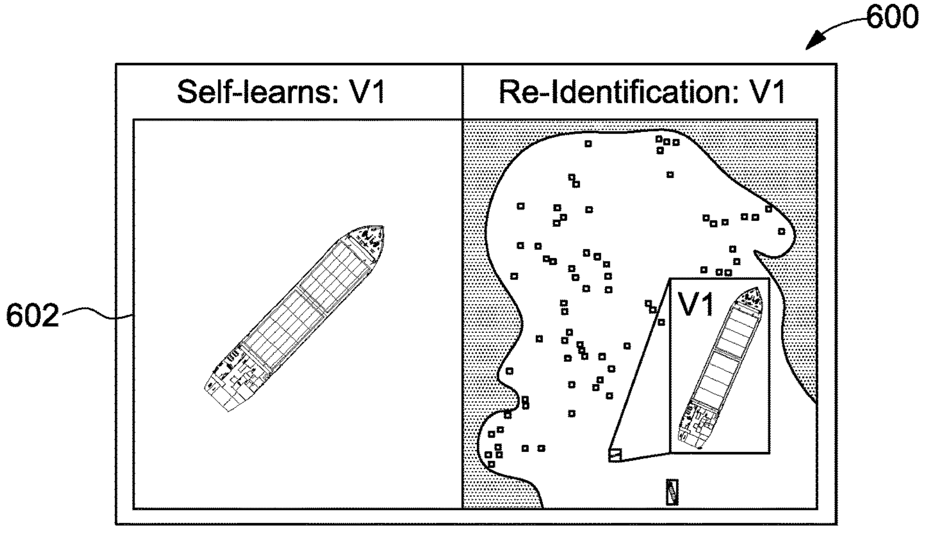

Referring now to FIGS. 6A-6C, an exemplary scenario 600 of identifying suspicious vessels in a designated area is depicted, in accordance with some embodiments of the present disclosure. FIGS. 6A-6C are explained in conjunction with FIGS. 1-5. FIG. 6A illustrates identification of various vessels 602, 604, and 606. The vessels 602, 604, 606 may correspond to suspicious vessels. This may include use of surveillance cameras or other monitoring systems to detect vessels within the designated area, such as a harbor or waterway.

An Artificial Intelligence (AI) model (such as the AI model 220) may analyze visual data captured by these surveillance cameras to identify different types of vessels present in the vicinity. The vessel 602 may be an unknown vessel (i.e., a new event), the vessel 604 may be a partially known vessel (i.e., a partially existing event), and the vessel 606 may be a known vessel (i.e., an existing event). The vessels 602, 604, 606 may be classified in these category based on the process discussed in FIGS. 3-5.

For example, a degree of proximity of the vessels 602, 604, 60 relative to each of a plurality of historical vessels within a database may be computed. Thereafter, for each of the vessels 602, 604, 606, a historical vessel of the plurality of historical vessels with the highest degree of proximity with the vessels 602, 604, 606 may be identified. Further, the degree of proximity of the vessels 602, 604, 606 relative to the historical vessel may be compared with a first predefined threshold and a second predefined threshold and based on that the vessels 602, 604, 606 may be classified in the new event, the partially existing event, and the existing event categories respectively.

Further, the dimensions of the vessels 602 604, 606 such as a frequency dimension, a recency dimension, a pattern dimension, and an impact dimension may be compared with a corresponding predefined threat threshold. For example, values corresponding to the frequency dimension, the recency dimension, the pattern dimension, and the impact dimension of the vessel 602 are "80", "50", "70", and "90", respectively. Further, the predefined threat thresholds for the frequency dimension, the recency dimension, the pattern dimension, and the impact dimension are "50", "40", "60", and "45", respectively. The values of first set of dimensions of the vessel 602 are above the corresponding predefined threat threshold. Thus, the vessel 602 may be identified as the at least one emerging threat. Similarly, values of the first set of dimensions of the vessel 604 and vessel 606 may be compared with the corresponding predefined threat threshold. For example, the values of the first set of dimensions of the vessels 604, 606 are above the corresponding predefined threat threshold. Thus, both the vessels 604, 606 may be considered as emerging threats or suspicious vessels.

FIG. 6B illustrates labelling of the vessels 602, and 604. These labels may indicate a type of vessel (e.g., cargo ship, fishing boat, or recreational vessel) or any specific characteristics that are relevant to context, such as size or behavior. FIG. 6C illustrates self-learning of unknown identified vessel 602 temporarily from few experiences and reidentification if seen again. Here, in FIG. 6B, the vessel 602 is temporarily labelled based on a user input. However, if the same vessel 602 is detected again in the future as illustrated in FIG. 6B, the AI model may re-identify the vessel 602 and update its label accordingly. This may reflect an ability to learn and adapt over time, improving its accuracy and effectiveness in identifying and categorizing vessels, especially those that may be considered suspicious or pose a potential threat.

Figure 7A:
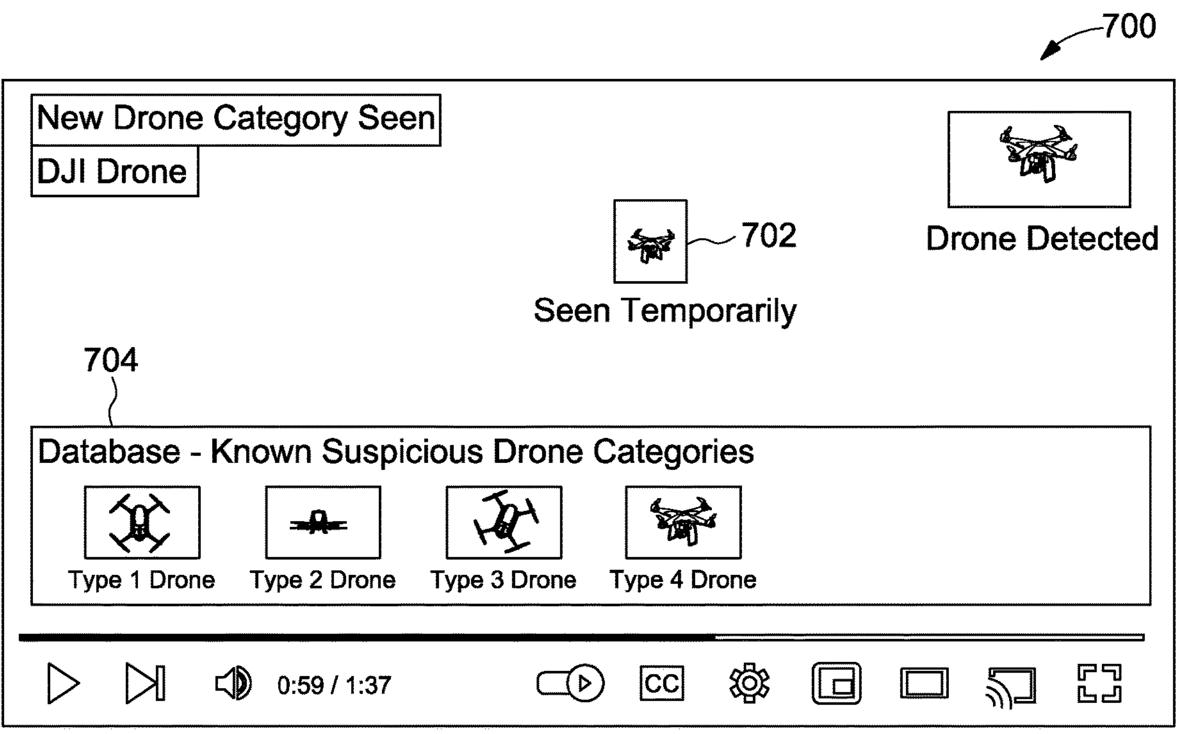
FIGS. 7A-7D illustrate an exemplary scenario of temporary learning process of a new event, in accordance with some embodiments of the present disclosure.

Referring now to FIGS. 7A-7D, an exemplary scenario 700 of temporary learning process of a new event, in accordance with some embodiments of the present disclosure. FIGS. 7A-7D are explained in conjunction with FIGS. 1-6A-6C. In FIG. 7A, a drone 702 may be detected temporarily. The drone 702 may belong to the new event category and pose a new label and characteristics not available in a database 704 which includes drones of existing event categories. As illustrated in FIG. 7A, the database 704 includes drones with the existing categories "Type 1", "Type 2", "Type 3", and "Type 4".

Figure 7B:
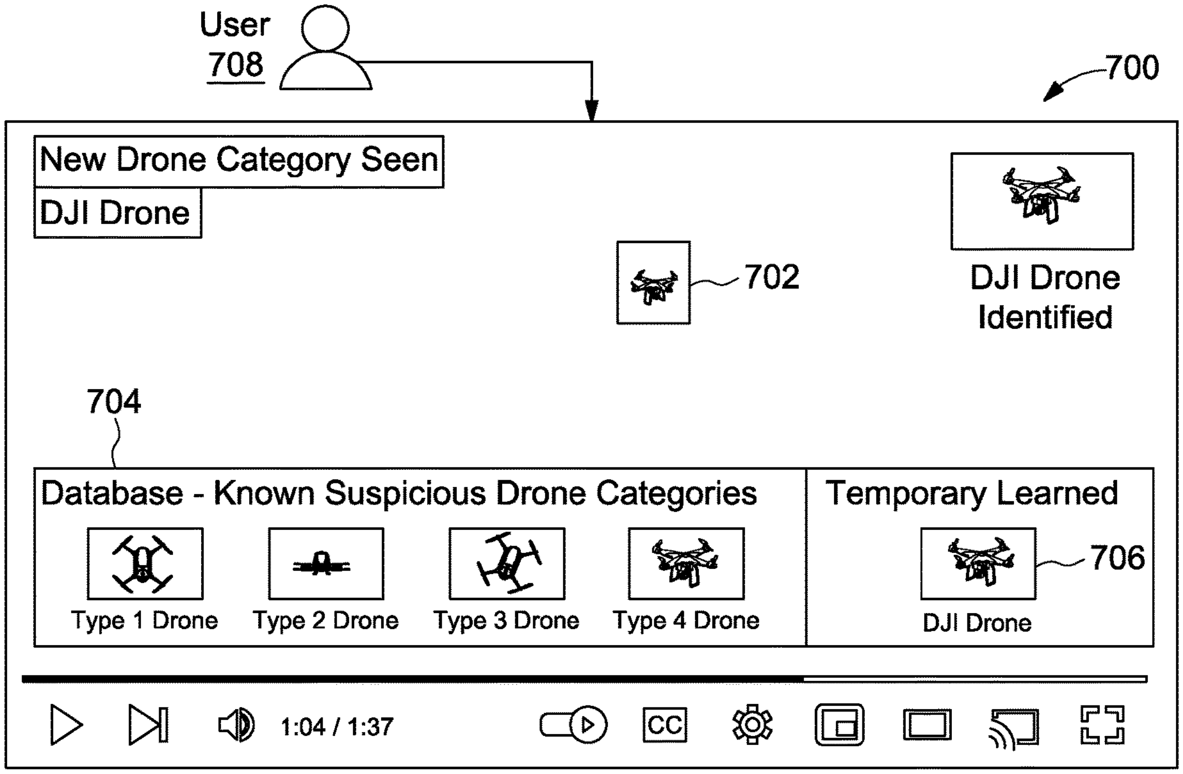

Referring now to FIG. 7B, the drone 702 is absent in the database 704. It should be noted that degree of proximity of the drone 702 relative to each of the "Type 1", "Type 2", "Type 3", and "Type 4" may be computed. Further, a drone from the drones "Type 1", "Type 2", "Type 3", and "Type 4" with the highest degree of proximity with the drone 702 may be determined. For example, the drone "Type 2" has the highest degree of proximity relative to the DJI drone 702. Further, the degree of proximity of the drone 702 relative to the "Type 2" may be compared with a threshold value (a first threshold and a second threshold) to classify the 702 drone as the new event. For example, the degree of proximity may be below the first threshold as well as below the second threshold. Thus, the DJI drone may be classified into the new event category. Further, in some embodiments, a user 708 may provide an input to label the drone 702 as a "DJI drone". Further, dimensions such as a frequency dimension, a recency dimension, a pattern dimension, and an impact dimension may be checked against corresponding threat threshold. If all these dimensions are above the corresponding threat thresholds the DJI drone may be identified as a threat.

Figure 7C:
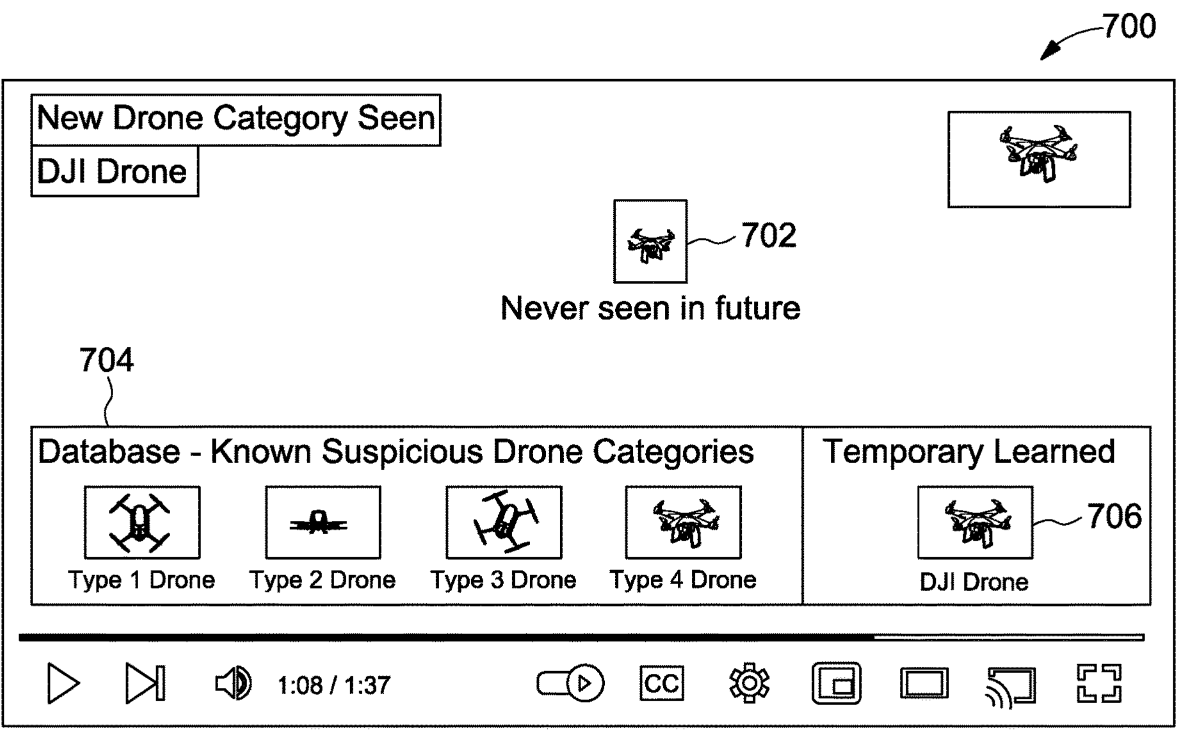
Figure 7D:
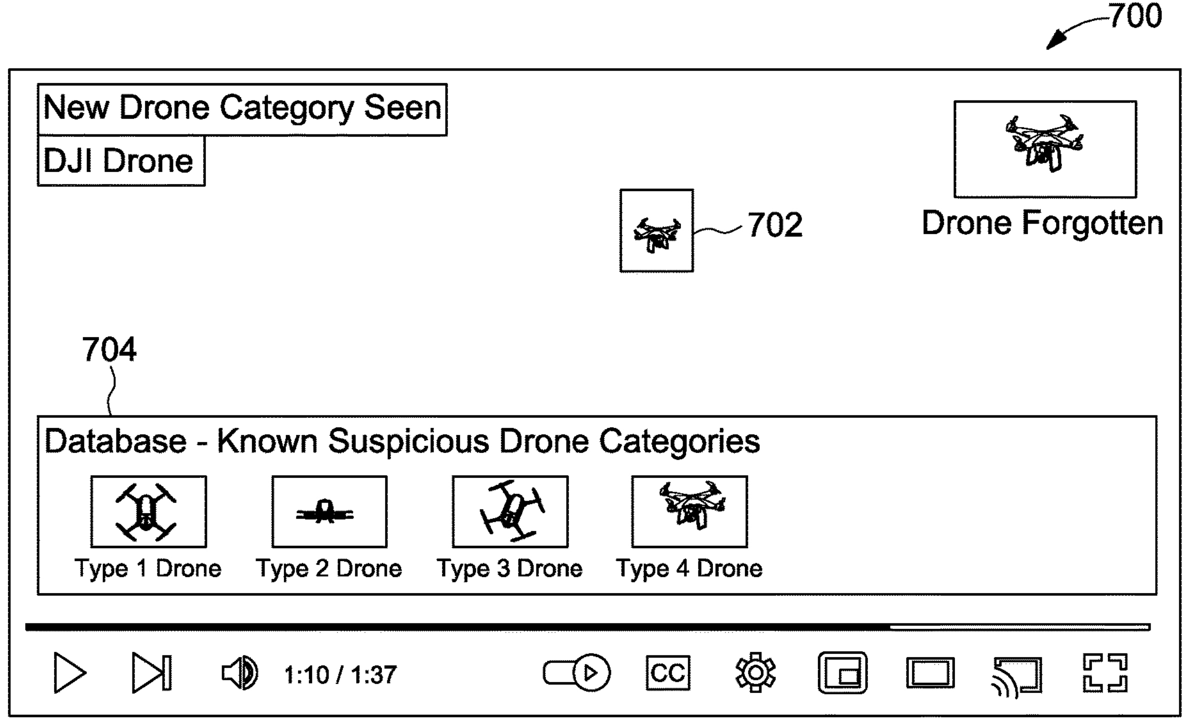

Further, the AI model (such as the AI model 220) may temporarily learn about the new event, the new label, and this threat. For example, feature vectors and the dimensions of the DJI drone 702 may be stored in the database 704 temporarily. In FIG. 7C, it is illustrated that the DJI drone 702 labelled as "DJI drone" is not encountered again in future within a predefined time period. Consequently, FIG. 7D illustrates removal or discarding of the new drone 702 and the corresponding new label 706 as "DJI drone" from the database 704, as the new drone is never seen again or absent in subsequent observations.

Figure 8A:
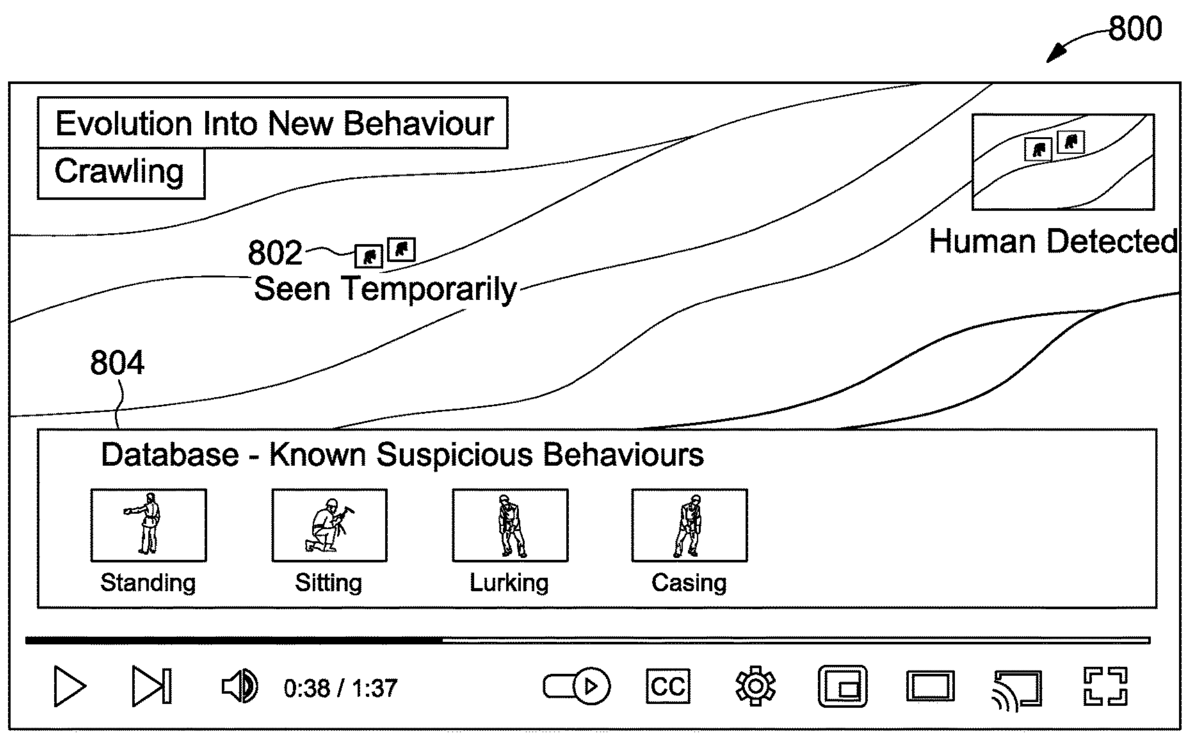
FIGS. 8A-8D illustrate an exemplary scenario of permanent learning process of a new behavior, in accordance with some embodiments of the present disclosure.
Figure 8B:
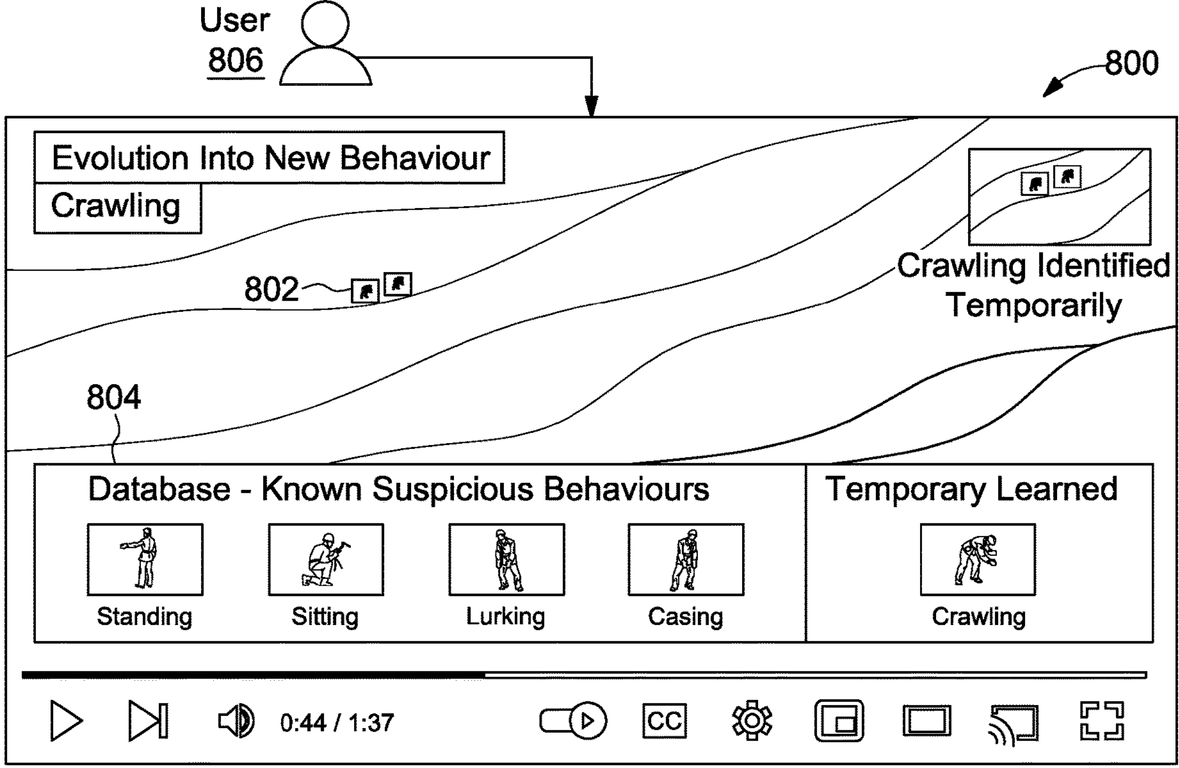

Referring now to FIGS. 8A-8D, an exemplary scenario 800 of permanent learning process of a new behavior, in accordance with some embodiments of the present disclosure. FIGS. 8A-8D are explained in conjunction with FIGS. 1-7A-7D. In FIG. 8A, a temporary detection of a human 802 is illustrated. Additionally, there is a database 804 associated with an AI model. The database 804 includes known behaviors (i.e., the existing events) such as "standing", "sitting", "lurking", and "casing". Further, in FIG. 8B, a new behavior (i.e., a new event) associated with the human 802 may be temporarily identified as "crawling". It should be noted that "crawling" may be identified as the new behavior due to its absence in the database 804. In some embodiment, a user input, or a new label as "crawling" for the new behavior may be received from a user 806. Thus, the AI model may learn "crawling" and it may be stored in the database 804, temporarily.

Figure 8C:
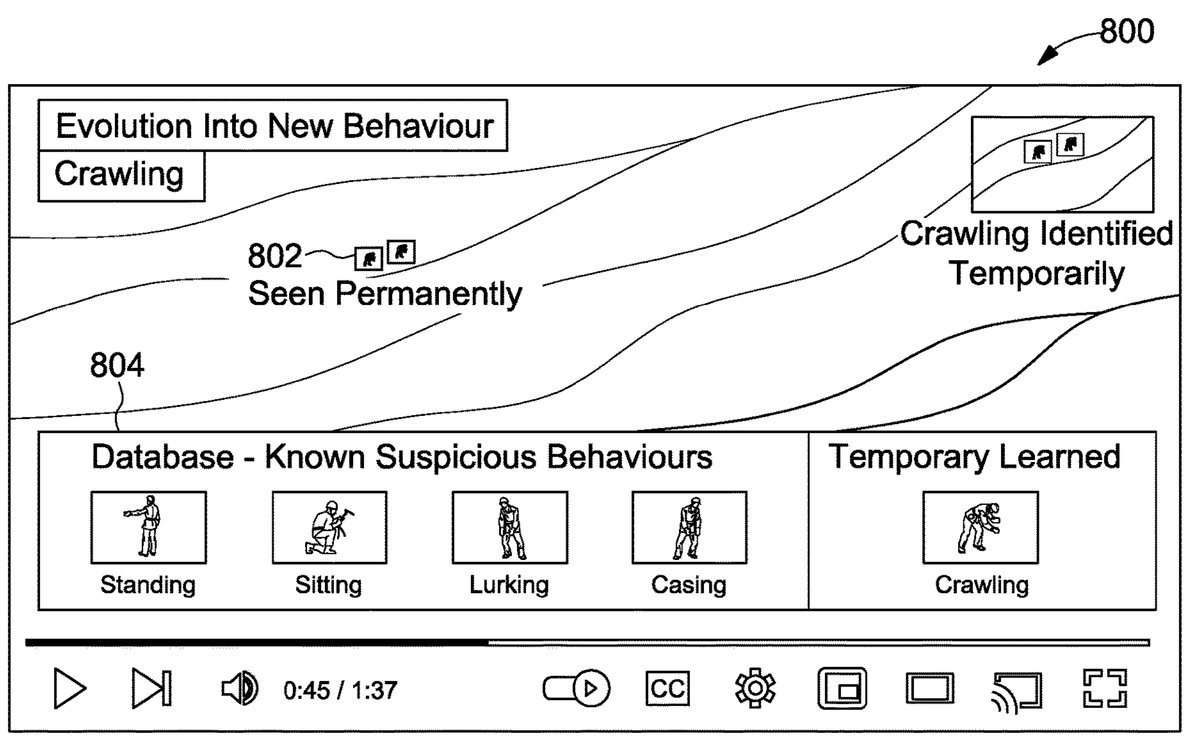
Figure 8D:
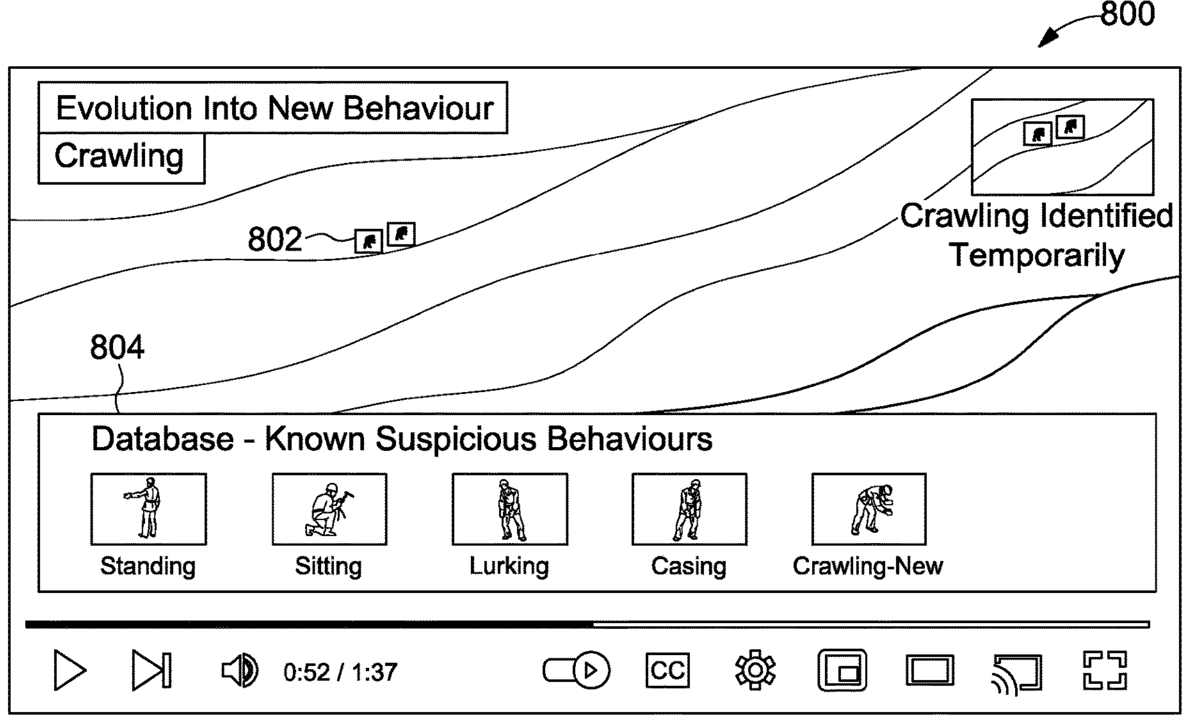

In FIG. 8C, it is illustrated that the new behavior is observed consistently over a certain time period. For example, the AI model continues to monitor behavior of the human and consistently observes instances of occurrences of "crawling". The sustained observation indicates that "crawling" is not merely a one-time occurrence but a consistent pattern of behavior. In FIG. 8D, since the new behavior "crawling" is observed permanently, the AI model permanently learns this behavior and "crawling" may be added permanently to the database 804. This means that "crawling" is now recognized as a known behavior by the AI model and may be used for future analysis and decision-making processes. In short, the AI model detects, learns, and permanently incorporates a new behavior into the database 804 if it is observed consistently.

The AI model may self-identify and adapt to recognize new behaviors, new threats, new objects. The AI model may continuously analyze incoming data, detect patterns, and identify potential threats or risks. As it encounters new data, situation, or environment, the AI model may autonomously update its understanding and detection capabilities, thereby evolving to better recognize and respond to emerging threats over time.

Figure 9:
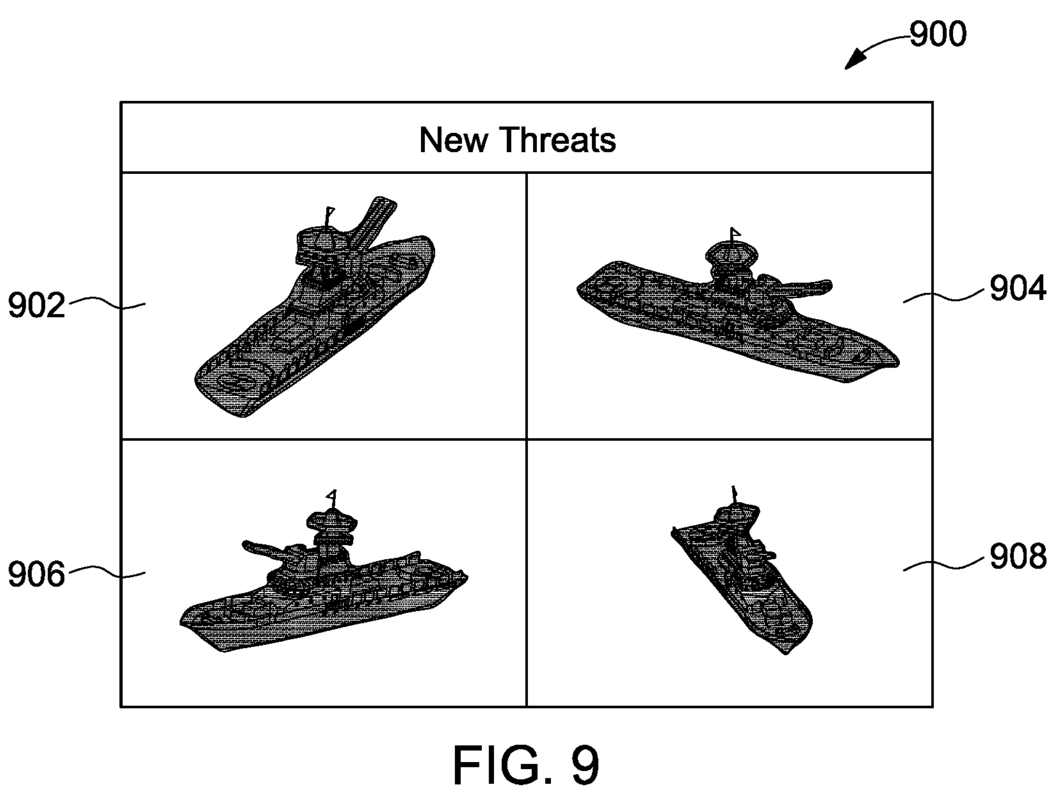
FIG. 9 illustrates exemplary new threats, in accordance with some embodiments of the present disclosure.

Referring now to FIG. 9, exemplary new threats 900 are illustrated, in accordance with some embodiments of the present disclosure. FIG. 9 is explained in conjunction with FIGS. 1-8A-8D. FIG. 9 includes various unknown vessels such as a vessel 902, a vessel 904, a vessel 906, and a vessel 908. In one example, the unknown threats may be Unmanned Aerial Vehicles (UAVs) of different shapes. In one example, the unknown threats may be suspicious behaviors. These behaviors may include drifting in sensitive areas, exhibiting irregular movements, carrying out unauthorized access attempts, or engaging in other anomalous activities. In one example, the new threats may include new payload types. The new payload types encompass a wide range of items or materials transported from one location to another, including cargo, equipment, or hazardous substances. As new technologies and industries evolve, the new payload types may emerge, each with unique characteristics. As illustrated in FIG. 9, one example of the new threats may be unknown vessels 902, 904, 906, and 908 traversing waterways or maritime zones. These vessels 902, 904, 906, and 908 may include, but are not limited to, ships, boats, or other watercraft whose identities or intentions are not readily apparent.

Further, the AI model may be capable of dealing with the difficulties in identification of new environments. The new environments may include heavy rain and snow, dense fog and strong wind, visibility (line of sight), and range and sensor limitations. For brevity, some examples of new threats and new environments are, however the AI model may be capable of dealing with a wide range of new threats and new environments.

Figure 10:
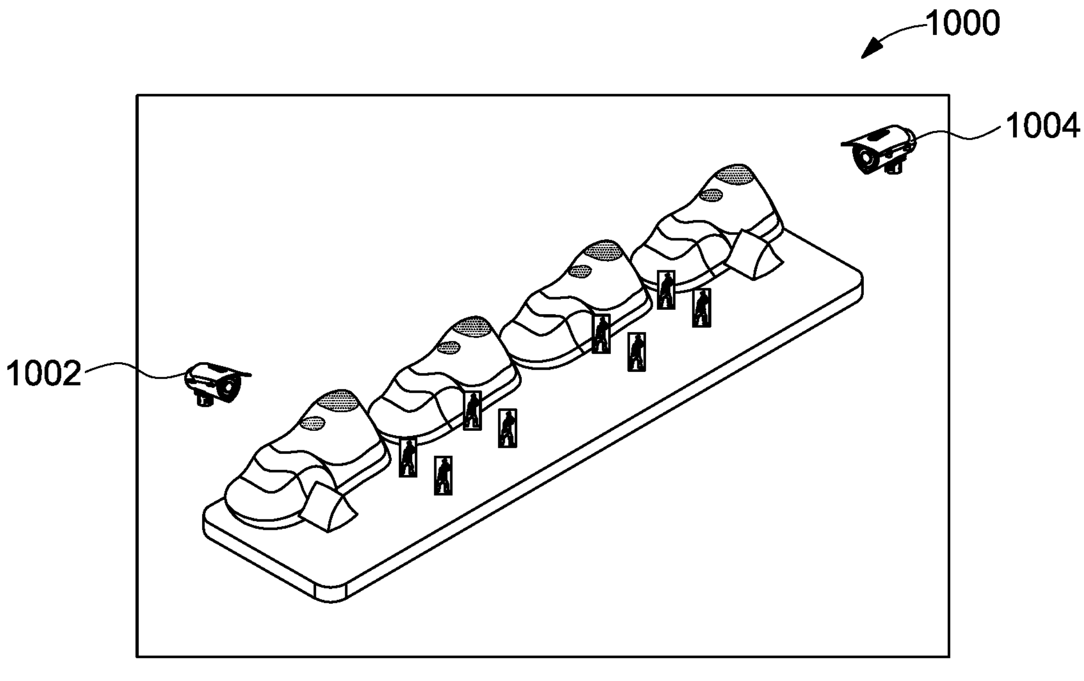
FIG. 10 illustrates identification of emerging threats in real-time in an exemplary border surveillance system, in accordance with some embodiments of the present disclosure.

Referring now to FIG. 10, identification of emerging threats in real-time in an exemplary border surveillance system 1000 is illustrated, in accordance with some embodiments of the present disclosure. FIG. 10 is explained in conjunction with FIGS. 1-9. The border surveillance system 1000 may employ an AI model (same as the AI model 220). The border surveillance system 1000 may include cameras 1002 and 1004 to capture various activities. The border surveillance system 1000 may swiftly and effectively detect known, partially known, and unknown emerging threats along borders and critical areas. The border surveillance system 1000 may analyze images captured by the cameras 1002, 1004, breaking the images into essential details like how often something occurs, when it happened recently, any unique patterns noticed, and how intense the activity seems. Thereafter, based on past events stored in a database (for example, the primary repository 214), the border surveillance system 1000 may compare a current situation (i.e., a current event) with similar incidents from the past. For example, if it is a vehicle approaching a border under the cover of darkness, the border surveillance system 1000 may access past instances of such occurrences. Further, the border surveillance system 1000 may determine proximity of the current event with historical situations (i.e., the historical events). It should be noted that different factors like a frequency, a recency, a pattern, and an intensity of activities may be considered while determining the proximity.

Based on the comparison, the border surveillance system 1000 may decide if the current event is something that has been seen before, or if the current event is partially new or entirely new, and potentially dangerous. For example, if the current event closely matches a known smuggling route. In such a case, an alarm may be generated, or a user may be notified. If the border surveillance system 1000 determines that a new threat is emerging, such as an unauthorized border crossing, the border surveillance system 1000 promptly may notify the relevant authorities. Simultaneously, the border surveillance system 1000 may update the database with detailed information about this new event and the new threat. Thus, border surveillance system 1000 enhances its ability to detect and respond to similar incidents in the future. This proactive approach ensures that the authorities may take swift action to address the threat, while also supporting system's effectiveness over time by continuously learning from and adapting to evolving situations.

The border surveillance system 1000 may leverage advanced surveillance technology, including, but not limited to, thermal imaging and motion sensors. As a result, the surveillance system 1000 may offer comprehensive monitoring capabilities to ensure enhanced safety and security. Further, the border surveillance system 1000 may detect emerging threats rapidly. For example, the border surveillance system 1000 may identify the threats in real-time whether it is unauthorized border crossings, suspicious activities, or potential security breaches. The border surveillance system 1000 may monitor large stretches of border territory, providing constant vigilance against intrusions or unlawful activities.

In some embodiments, the border surveillance system 1000 may help securing national borders against various threats and unauthorized activities. By way of an example, the border surveillance system 1000 may detect the threats and the unauthorized activities including perimeter intrusion, drifting and suspicious activity, concealed weapons, and cross-border movement. Additionally, in some embodiments, the border surveillance system 1000 may enhance security within military bases and other critical defense installations. For example, the border surveillance system 1000 may perform VIP vehicle identification, environmental hazard detection, tarmac, and sensitive area monitoring.

Moreover, the border surveillance system 1000 may help safeguard critical defense infrastructure and assets, particularly in strategic locations. For example, the border surveillance system 1000 may perform crowd formation analysis, movement pattern recognition, equipment and vehicle monitoring, and monitoring changes in environmental structures.

By way of an example, in some embodiments, the disclosure may be implemented in aerial reconnaissance and elimination systems (ARIES). In such a case, the ARIES may ensure comprehensive airspace security. The ARIES may provide advanced surveillance, threat prediction, and rapid response capabilities by detecting and tracking all airborne objects. The ARIES may also include ground-based systems for early warning and protection of military bases, government buildings, and airports against aerial threats. The ARIES may enhance security through advanced global defense strategies and border surveillance capabilities. For example, the ARIES may perform Unmanned Aerial Vehicle (UAV) detection, military aircraft monitoring, flight pattern analysis, real-time airspace mapping. Further, the ARIES may help Implement sophisticated safety measures and event management systems for urban environments and large-scale events. For example, the ARIES may perform object recognition, behavioral analysis, alert generation and threat prioritization, and the like. In some embodiments, the ARIES may analyze UAV patterns and formations to identify coordinated threats, enhancing situational awareness and countermeasure planning, for example by performing UAV pattern and formation analysis, providing enhanced situational awareness, identification of coordinated threats, and providing support in countermeasure planning.

By way of another example, in some embodiments, the disclosure may be implemented in Marine Reconnaissance Systems (MIRAS). The MIRAS may detect suspicious behaviors and focus on labeling of the suspicious behaviors and proactively alert against the suspicious behavior near coastal areas and water boundaries. The MIRAS may safeguard marine environments by tracking vessels and identifying critical threats, such as unknown vessels, fisherman vessels, ship traffic, and the like. The MIRAS may detect unknown vessels at sea to identify potentially illegal activities. The MIRAS help securing maritime borders and coastal areas against unauthorized activities, smuggling, and security threats through labelling of maritime intrusion detection, suspicious vessel tracking, underwater movement detection, and coastal activity analysis. Further, the MIRAS may ensure safety and security of commercial and military ports, including cargo and personnel movements through the labelling of vessel tracking monitoring, container and cargo inspection, unauthorized access reporting, and critical infrastructure and asset protection. Additionally in some embodiments, the MIRAS may identify and prevent illegal fishing activities, preserving marine ecosystems, and enforcing fishing regulations through unauthorized fishing vessel identification, overfishing activity monitoring, protected species and habitat surveillance, and cross-border fishing activity tracking. Further, the MIRAS may provide critical capabilities for search and rescue operations, enforce maritime laws, and support underwater archaeological research and exploration, ensuring legal compliance and safety at sea. For example, the MIRAS may perform search and rescue operations, maritime legal enforcement, and archaeological and historical research. Moreover, the MIRAS may safeguard marine ecosystems and focus on conducting environmental research, assessing climate change impacts, managing oil spill responses, and monitoring aquaculture through maritime environmental research, oil spill detection and response, climate change impact assessment, and aquaculture monitoring.

By way of an example, the disclosure may have a utility in Drone Reconnaissance and Observation System (DROS). The DROS may utilize drones to identify different concepts, such as people, vehicles, infrastructure etc., in optical and thermal modalities to provide actionable insights to law enforcement agencies. For example, the DROS may identify and label intrusion, violence and riot, suspicious vehicles and traffic. The DROS may identify objects of interest through drones. The DROS seamlessly integrates military-grade drones with optical and thermal capabilities. The DROS excels in detecting and labelling unknown objects, individuals, and vehicles, significantly enhancing situational awareness and operational effectiveness. The DROS is a cutting-edge solution that identifies potential threats in real-time, ensuring timely alerts to authorities. In some embodiments, the DROS may monitor urban environments for security and public safety through riot and disturbance monitoring, urban traffic analysis, public event surveillance, and critical infrastructure watch. The DROS may enhance law enforcement capabilities with advanced drone reconnaissance through crime scene analysis, suspect tracking and identification, covert surveillance operations, and emergency response coordination. Further, the DROS may provide strategic intelligence and environmental oversight using drone technology through geographical and environmental surveillance, border patrol and security, natural disaster assessment and response, and wildlife and environmental conservation.

By way of an example, the disclosure may have a utility in accident hotspot detection and self-labelling. The real-time driver alerts about accident-prone conditions may be enhanced with a self-learning capability to detect new curves, patterns, and evolving risk factors. The disclosure leverages real-time road condition data and historical incident analysis, continually adapting and updating its algorithms. This dynamic adaptation ensures that the driver receives the most relevant and timely warnings, tailored to constantly changing factors that contribute to accident risks on the road. The disclosure significantly boosts safety by proactively identifying and responding to new and emerging threats in driving environments.

Figure 11:
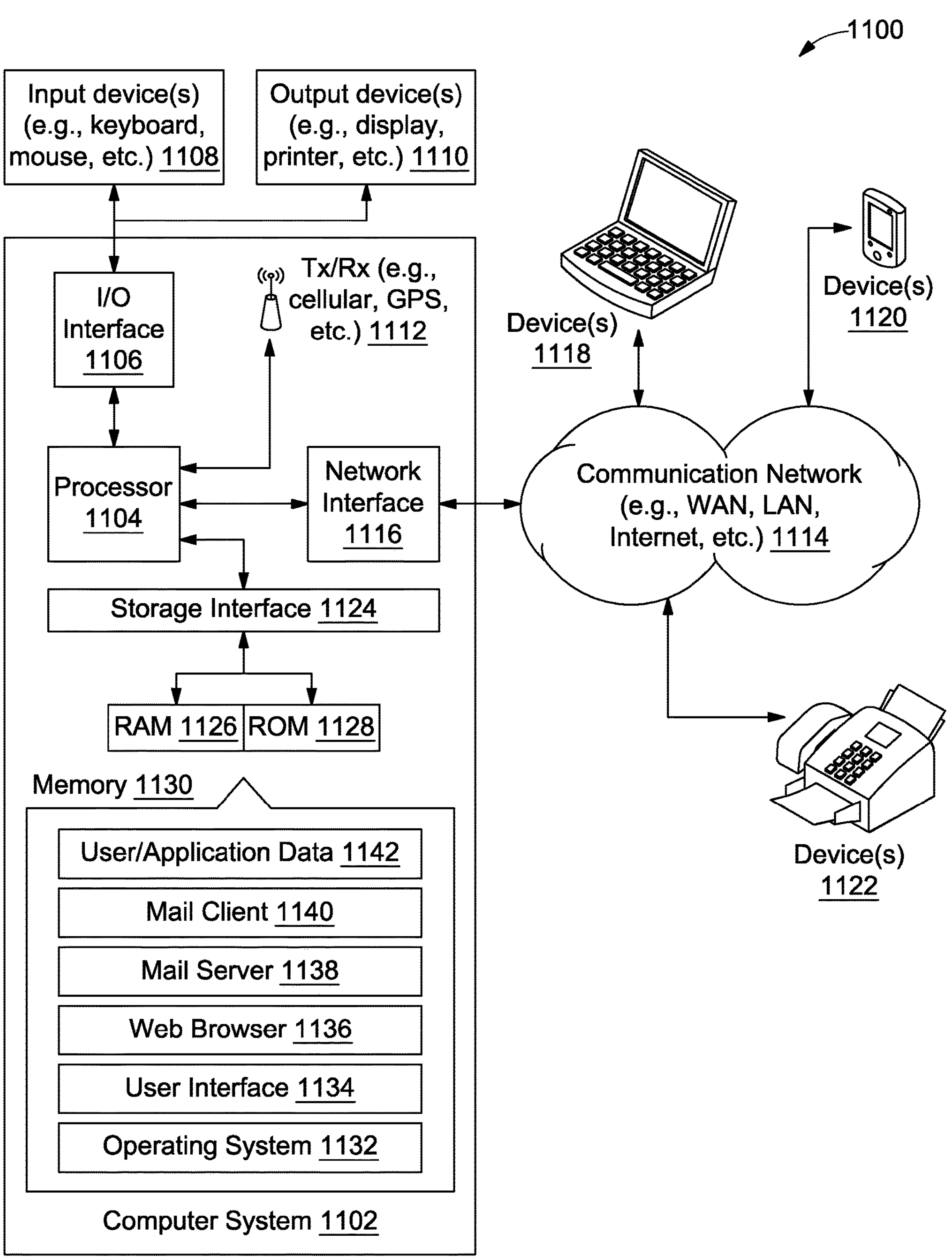
FIG. 11 illustrates a block diagram of an exemplary computer system for implementing embodiments consistent with the present disclosure.

Referring now to FIG. 11, a block diagram 1100 of an exemplary computer system 1102 for implementing various embodiments is illustrated. Computer system 1102 may include a central processing unit ('CPU' or 'processor') 1104. Processor 1104 may include at least one data processor for executing program components for executing user or system-generated requests. A user may include a person, a person using a device such as such as those included in this disclosure, or such a device itself. Processor 1104 may include specialized processing units such as integrated system (bus) controllers, memory management control units, floating point units, graphics processing units, digital signal processing units, etc. Processor 1104 may include a microprocessor, such as AMD® ATHLOM® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 1104 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1104 may be disposed in communication with one or more input/output (I/O) devices via an I/O interface 1106. I/O interface 1106 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 1002.n/b/g/n/x, Bluetooth, cellular (for example, code-division multiple access (CDMA), high-speed packet access (HSPA+), global system for mobile communications (GSM), long-term evolution (LTE), WiMAX, or the like), etc.

Using I/O interface 1106, computer system 1102 may communicate with one or more I/O devices. For example, an input device 1108 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1110 may be a printer, fax machine, video display (for example, cathode ray tube (CRT), liquid crystal display (LCD), light-emitting diode (LED), plasma, or the like), audio speaker, etc. In some embodiments, a transceiver 1112 may be disposed in connection with processor 1104. Transceiver 1112 may facilitate various types of wireless transmission or reception. For example, transceiver 1112 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 1104 may be disposed in communication with a communication network 1114 via a network interface 1116. Network interface 1116 may communicate with communication network 1114. Network interface 1116 may employ connection protocols including, without limitation, direct connect, Ethernet (for example, twisted pair 10/100/1000 Base T), transmission control protocol/internet protocol (TCP/IP), token ring, IEEE 802.11a/b/g/n/x, etc. Communication network 1114 may include, without limitation, a direct interconnection, local area network (LAN), wide area network (WAN), wireless network (for example, using Wireless Application Protocol), the Internet, etc. Using network interface 1116 and communication network 1114, computer system 1102 may communicate with devices 1118, 1120, and 1122. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1102 may itself embody one or more of these devices.

In some embodiments, processor 1104 may be disposed in communication with one or more memory devices (for example, RAM 1126, ROM 1128, etc.) via a storage interface 1124. Storage interface 1124 may connect to memory 1130 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1130 may store a collection of program or database components, including, without limitation, an operating system 1132, user interface 1134, web browser 1136, mail server 1138, mail client 1140, user/application data 1142 (for example, any data variables or data records discussed in this disclosure), etc. Operating system 1132 may facilitate resource management and operation of computer system 1102. Examples of operating systems 1132 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 1134 may facilitate display, execution, interaction, manipulation, or operation of program components through textual or graphical facilities. For example, user interfaces may provide computer interaction interface elements on a display system operatively connected to computer system 1102, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 1102 may implement a web browser 1136 stored program component. Web browser 1136 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 1102 may implement a mail server 1138 stored program component. Mail server 1138 may be an Internet mail server such as MICROSOFT® EXCHANGE® mail server, or the like. Mail server 1138 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 1138 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1102 may implement a mail client 1140 stored program component. Mail client 1140 may be a mail viewing application, such as APPLE MAIL® mail-client, MICROSOFT ENTOURAGE® mail client, MICROSOFT OUTLOOK® mail client, MOZILLA THUNDERBIRD® mail client, etc.

In some embodiments, computer system 1102 may store user/application data 1142, such as the data, variables, records, etc. as described in this disclosure. Such databases may be implemented as fault-tolerant, relational, scalable secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

The disclosure offers several advantages including enhanced surveillance and threat detection capabilities. By leveraging AI and advanced analysis techniques, the disclosure may efficiently process large volumes of content captured by surveillance cameras. This allows for real-time identification and classification of events, ranging from routine activities to potential security threats. The disclosure includes comparing incoming data with historical events stored in repositories. This comparison enables recognition of patterns and anomalies. As a result, the disclosure provides valuable insights for threat assessment.

The disclosure includes analyzing multiple dimensions of observed events, including frequency, recency, pattern, and intensity, providing a comprehensive understanding of the situation. This leads to more accurate threat detection and classification. Further the disclosure includes utilization of proximity analysis and histogram representations, for example the observed event is compared with historical data, enabling quick decision-making and response to potential threats. The disclosure includes identifying emerging threats in real-time, thereby enables proactive intervention to mitigate potential risks before they escalate. This proactive approach enhances overall security measures. The disclosure includes continuous updating of database with new event data, allowing for ongoing learning and improvement. This ensures that the system remains effective in detecting and responding to evolving threats over time.

The disclosure enables early detection and proactive response to potential risks, mitigating the impact of unforeseen events and enhancing overall security measures. The disclosure provides a proactive and reliable solution for addressing the challenges posed by unexpected threats in open environments, ultimately supporting the effectiveness of protection mechanisms and safeguarding against potential vulnerabilities.

Moreover, dynamic nature of the primary and secondary repositories helps optimize data storage and management. For example, events initially identified as potential threats may be temporarily stored in the secondary repository for further analysis. If these events recur or exhibit significant threat indicators, the events can then be permanently stored in the primary repository. Conversely, non-recurring events can be automatically deleted after a predefined period, minimizing unnecessary data retention. This scalable approach ensures that the system maintains an up-to-date database of known threats while efficiently managing storage resources. Additionally, the disclosure provides capability to adapt and learn from new data and further enhances its effectiveness over time, enabling continuous improvement in threat detection and response strategies.

Further, the Visual Token Adaptation Framework (VTAF) offers several advantages in the realm of visual representation learning. Its emphasis on continuous token adaptation ensures that the system remains highly dynamic, effectively capturing evolving visual trends and a wide range of visual information. Furthermore, utilization of a cosine similarity based matching network enables precise matching and evaluation of visual tokens, facilitating nuanced differentiation between them with high accuracy and efficiency. Moreover, VTAF's robust and adaptive learning capabilities, driven by dynamic feedback mechanisms and token evolution, foster a learning environment that is responsive and adaptive. This allows for deep understanding and representation of visual content over time, making the VTAF a powerful approach to visual representation learning.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for identifying emerging threats in real-time, the method comprising:

receiving, by an Artificial Intelligence (AI) model, a first set of feature vectors created from content comprising an event comprising one or more entities;

determining, by the AI model, a first set of dimensions for each of the first set of feature vectors;

comparing the first set of dimensions, for each of the first set of feature vectors, by the AI model, with a second set of dimensions associated with each of a plurality of second sets of feature vectors created for historical events, wherein the second set of dimensions and the plurality of second sets of feature vectors are stored in an associated primary repository, wherein the first set of dimensions and the second set of dimensions comprise at least one of a frequency dimension, a recency dimension, a pattern dimension, and an intensity dimension;

computing, by the AI model, a degree of proximity of the first set of feature vectors relative to each of the plurality of second sets of feature vectors based on the comparison, through a proximity analysis;

identifying, by the AI model, contemporaneous to receiving the first set of feature vectors, a second set of feature vectors from the plurality of second sets of feature vectors, wherein the second set of feature vectors has the highest degree of proximity to the first set of feature vectors;

classifying, by the AI model, the event into an event category from a plurality of predefined event categories based on the degree of proximity of the first set of feature vectors relative to the second set of feature vectors and at least one predefined threshold, wherein the plurality of predefined event categories comprises an existing event, a new event, and a partially existing event; and identifying, by the AI model, the event as at least one emerging threat, in response to the classifying.

2. The method of claim 1, wherein the computing further comprises:

generating one or more clusters of feature vectors based on a similarity analysis performed on the plurality of second sets of feature vectors, wherein each of the one or more clusters comprises a visual word associated with a corresponding centroid;

generating a second histogram representation for each of the one or more clusters based on the corresponding visual word;

generating a first histogram representation for the first set of feature vectors; and comparing the first histogram representation with each of the second histogram representation generated for the one or more clusters through the proximity analysis.

3. The method of claim 1, further comprising:

assigning a weight to each of the first set of feature vectors based on a predefined weight allocation criteria.

4. The method of claim 3, wherein the computing further comprises determining the degree of proximity based on the weight assigned to each of the first set of feature vectors.

5. The method of claim 1, wherein classifying the event further comprises comparing the degree of proximity of the first set of feature vectors relative to the second set of feature vectors with the at least one predefined threshold, and wherein the at least one predefined threshold comprises a first predefined threshold and a second predefined threshold.

6. The method of claim 5, wherein the event is classified as the existing event when the degree of proximity of the first set of feature vectors relative to the second set of feature vectors is above or equal to the first predefined threshold, wherein the event is classified as the partially existing event when the degree of proximity of the first set of feature vectors relative to the second set of feature vectors is below the first predefined threshold and above or equal to the second predefined threshold, and wherein the event is classified as the new event when the degree of proximity of the first set of feature vectors relative to the second set of feature vectors is below the second predefined threshold.

7. The method of claim 1, further comprising:

classifying the event as a new event;

comparing, for the event, each of the first set of dimensions with a corresponding predefined threat threshold; and identifying the event as the at least one emerging threat when each of the first set of dimensions is above the corresponding predefined threat threshold.

8. The method of claim 7, further comprising storing the first set of dimensions and the first set of feature vectors associated with the event in a second repository.

9. The method of claim 7, further comprising:

notifying, in real-time, a user about the at least one emerging threat in response to identifying the at least one emerging threat; and automatically updating the primary repository with the first set of feature vectors and the first set of dimensions associated with the event.

10. The method of claim 9, further comprising training the AI model using the updated primary repository, wherein training the AI model further comprises modifying in real-time or near real-time, a set of parameters of the AI model based on the updated primary repository.

11. The method of claim 1, wherein:

the frequency dimension corresponds to a frequency of occurrence of the event captured within the content;

the recency dimension corresponds to time-based proximity with a timestamp associated with the content;

the pattern dimension corresponds to a modification in one or more attributes of the one or more entities; and the intensity dimension corresponds to a magnitude of an impact of event.

12. The method of claim 11, wherein the pattern dimension is determined based on motion signatures of the one or more entities during occurrence of the event.

13. A system for identifying emerging threats in real-time, the system comprising:

a processor; and a memory communicatively coupled to the processor, wherein the memory stores processor-executable instructions, which, on execution, causes the processor to:

receive a first set of feature vectors created from content comprising an event comprising one or more entities;

determine a first set of dimensions for each of the first set of feature vectors;

compare the first set of dimensions, for each of the first set of feature vectors, with a second set of dimensions associated with each of a plurality of second sets of feature vectors created for historical events, wherein the second set of dimensions and the plurality of second sets of feature vectors are stored in an associated primary repository, wherein the first set of dimensions and the second set of dimensions comprise at least one of a frequency dimension, a recency dimension, a pattern dimension, and an intensity dimension;

compute a degree of proximity of the first set of feature vectors relative to each of the plurality of second sets of feature vectors based on the comparison, through a proximity analysis;

identify, contemporaneous to receiving the first set of feature vectors, a second set of feature vectors from the plurality of second sets of feature vectors, wherein the second set of feature vectors has the highest degree of proximity to the first set of feature vectors;

classify the event into an event category from a plurality of predefined event categories based on the degree of proximity of the first set of feature vectors relative to the second set of feature vectors and at least one predefined threshold, wherein the plurality of predefined event categories comprises an existing event, a new event, and a partially existing event; and identify the event as at least one emerging threat, in response to the classifying.

14. The system of claim 13, wherein the processor-executable instructions further cause the processor to:

generate one or more clusters of feature vectors based on a similarity analysis performed on the plurality of second sets of feature vectors, wherein each of the one or more clusters comprises a visual word associated with a corresponding centroid;

generate a second histogram representation for each of the one or more clusters based on the corresponding visual word;

generate a first histogram representation for the first set of feature vectors; and compare the first histogram representation with each of the second histogram representation generated for the one or more clusters through the proximity analysis.

15. The system of claim 13, wherein the processor-executable instructions further cause the processor to:

assign a weight to each of the first set of feature vectors based on a predefined weight allocation criteria.

16. The system of claim 15, wherein the processor-executable instructions further cause the processor to compute the degree of proximity by determining the degree of proximity based on the weight assigned to each of the first set of feature vectors.

17. The system of claim 13, wherein the processor-executable instructions further cause the processor to classify the event by comparing the degree of proximity of the first set of feature vectors relative to the second set of feature vectors with the at least one predefined threshold, and wherein the at least one predefined threshold comprises a first predefined threshold and a second predefined threshold.

18. The system of claim 17, wherein the event is classified as the existing event when the degree of proximity of the first set of feature vectors relative to the second set of feature vectors is above or equal to the first predefined threshold, wherein the event is classified as the partially existing event when the degree of proximity of the first set of feature vectors relative to the second set of feature vectors is below the first predefined threshold and above or equal to the second predefined threshold, and wherein the event is classified as the new event when the degree of proximity of the first set of feature vectors relative to the second set of feature vectors is below the second predefined threshold.

19. The system of claim 13, wherein the processor-executable instructions further cause the processor to:

classify the event as a new event;

compare, for the event, each of the first set of dimensions with a corresponding predefined threat threshold; and identify the event as the at least one emerging threat when each of the first set of dimensions is above the corresponding predefined threat threshold.

20. The system of claim 19, wherein the processor-executable instructions further cause the processor to store the first set of dimensions and the first set of feature vectors associated with the event in a second repository.

21. The system of claim 19, wherein the processor-executable instructions further cause the processor to:

notify, in real-time, a user about the at least one emerging threat in response to identifying the at least one emerging threat; and automatically update the primary repository with the first set of feature vectors and the first set of dimensions associated with the event.

22. The system of claim 21, wherein the processor-executable instructions further cause the processor to train an Artificial Intelligence (AI) model using the updated primary repository, wherein training the AI model further comprises modifying in real-time or near real-time, a set of parameters of the AI model based on the updated primary repository.

23. The system of claim 13, wherein:

the frequency dimension corresponds to a frequency of occurrence of the event captured within the content;

the recency dimension corresponds to time-based proximity with a timestamp associated with the content;

the pattern dimension corresponds to a modification in one or more attributes of the one or more entities; and the intensity dimension corresponds to a magnitude of an impact of event.

24. The system of claim 23, wherein the pattern dimension is determined based on motion signatures of the one or more entities during occurrence of the event.

25. A non-transitory computer-readable medium storing computer-executable instructions for identifying emerging threats in real-time, the stored instructions, when executed by a processor, cause the processor to perform operations comprising:

receiving a first set of feature vectors created from content comprising an event comprising one or more entities;

determining a first set of dimensions for each of the first set of feature vectors;

comparing the first set of dimensions, for each of the first set of feature vectors, with a second set of dimensions associated with each of a plurality of second sets of feature vectors created for historical events, wherein the second set of dimensions and the plurality of second sets of feature vectors are stored in an associated primary repository, wherein the first set of dimensions and the second set of dimensions comprise at least one of a frequency dimension, a recency dimension, a pattern dimension, and an intensity dimension;

computing a degree of proximity of the first set of feature vectors relative to each of the plurality of second sets of feature vectors based on the comparison, through a proximity analysis;

identifying, contemporaneous to receiving the first set of feature vectors, a second set of feature vectors from the plurality of second sets of feature vectors, wherein the second set of feature vectors has the highest degree of proximity to the first set of feature vectors;

classifying the event into an event category from a plurality of predefined event categories based on the degree of proximity of the first set of feature vectors relative to the second set of feature vectors and at least one predefined threshold, wherein the plurality of predefined event categories comprises an existing event, a new event, and a partially existing event; and identifying the event as at least one emerging threat, in response to the classifying.

* * * * *